United States Patent
Kremin et al.

(10) Patent No.: US 10,216,314 B2
(45) Date of Patent: *Feb. 26, 2019

(54) MULTI-PHASE SCANNING

(71) Applicant: Parade Technologies, Ltd., Santa Clara, CA (US)

(72) Inventors: Viktor Kremin, Lviv (UA); Roman Ogirko, Lviv (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 15/065,820

(22) Filed: Mar. 9, 2016

(65) Prior Publication Data

US 2016/0188105 A1 Jun. 30, 2016

Related U.S. Application Data

(63) Continuation of application No. 12/981,332, filed on Dec. 29, 2010, now Pat. No. 9,285,902.

(60) Provisional application No. 61/376,762, filed on Aug. 25, 2010.

(51) Int. Cl.
*G06F 3/041* (2006.01)
*G06F 3/044* (2006.01)

(52) U.S. Cl.
CPC ............ *G06F 3/0416* (2013.01); *G06F 3/041* (2013.01); *G06F 3/044* (2013.01); *G06F 3/0412* (2013.01); *G06F 2203/04108* (2013.01)

(58) Field of Classification Search
CPC ........ G09F 3/0416; G09F 3/044; G09F 3/041; G06F 2203/04108
See application file for complete search history.

(56) References Cited

U.S. PATENT DOCUMENTS

| 5,357,266 | A | 10/1994 | Tagawa |
| 5,565,658 | A | 10/1996 | Gerpheide et al. |
| 5,835,076 | A | 11/1998 | Machida et al. |

(Continued)

OTHER PUBLICATIONS

Kremin, Office Action, U.S. Appl. No. 12/981,332, dated Apr. 15, 2013, 17 pgs.

(Continued)

*Primary Examiner* — Jonathan R Horner
(74) *Attorney, Agent, or Firm* — Morgan, Lewis & Bockius LLP

(57) ABSTRACT

A touch sensing apparatus includes a touch sensing surface having a plurality of TX electrodes and a plurality of RX electrodes. The touch sensing apparatus also includes capacitance sensing circuitry. The circuitry receives a plurality of drive signals. For each of a plurality of scanning stages, the circuitry applies a respective one of the plurality of drive signals to each of the plurality of TX electrodes substantially simultaneously according to a respective TX pattern. The respective TX pattern for each scanning stage is distinct. The circuitry receives sense signals from the plurality of RX electrodes. Each of the plurality of sense signals represents capacitance of a respective intersection of a respective TX electrode and a respective RX electrode. The circuitry then correlates the received sense signals for the plurality of scanning stages with the received drive signals to detect an object proximate to the touch panel.

20 Claims, 16 Drawing Sheets

(56) References Cited

U.S. PATENT DOCUMENTS

| | | | |
|---|---|---|---|
| 5,905,489 | A | 5/1999 | Takahama et al. |
| 6,256,022 | B1 | 7/2001 | Manaresi et al. |
| 8,237,667 | B2 * | 8/2012 | Krah .................. G06F 3/0416 329/304 |
| 8,780,065 | B2 * | 7/2014 | Ribeiro ................ G06F 3/0412 345/173 |
| 2003/0020721 | A1 | 1/2003 | Kanzaki et al. |
| 2003/0025684 | A1 | 2/2003 | Chiang et al. |
| 2007/0075923 | A1 * | 4/2007 | Beuker ................ G09G 3/3625 345/55 |
| 2008/0079699 | A1 | 4/2008 | Mackey |
| 2008/0158167 | A1 * | 7/2008 | Hotelling ............ G06F 3/0416 345/173 |
| 2009/0153152 | A1 | 6/2009 | Maharyta et al. |
| 2009/0229893 | A1 * | 9/2009 | Muranaka ............ G06F 3/044 178/20.01 |
| 2009/0256818 | A1 * | 10/2009 | Noguchi ............ G02F 1/13338 345/174 |
| 2010/0033196 | A1 | 2/2010 | Hayakawa et al. |
| 2010/0059295 | A1 * | 3/2010 | Hotelling ............ G06F 3/0416 178/18.06 |
| 2010/0060591 | A1 | 3/2010 | Yousefpor et al. |
| 2010/0060593 | A1 | 3/2010 | Krah |
| 2010/0073341 | A1 | 3/2010 | Toyooka et al. |
| 2010/0149108 | A1 | 6/2010 | Hotelling et al. |
| 2010/0238134 | A1 * | 9/2010 | Day ...................... G06F 3/0412 345/174 |
| 2010/0244859 | A1 | 9/2010 | Cormier, Jr. et al. |
| 2010/0295564 | A1 | 11/2010 | Reynolds |
| 2011/0055305 | A1 | 3/2011 | Matsushima |
| 2011/0063154 | A1 | 3/2011 | Hotelling et al. |
| 2011/0163992 | A1 | 7/2011 | Cordeiro et al. |
| 2012/0056841 | A1 * | 3/2012 | Krenik .................. G06F 3/0418 345/174 |

OTHER PUBLICATIONS

Kremin, Office Action, U.S. Appl. No. 12/981,332, dated Feb. 26, 2014, 21 pgs.
Kremin, Final Office Action, U.S. Appl. No. 12/981,332, dated May 8, 2014, 21 pgs.
Kremin, Office Action, U.S. Appl. No. 12/981,332, dated Apr. 29, 2015, 18 pgs.
Kremin, Notice of Allowance, U.S. Appl. No. 12/981,332, dated Nov. 5, 2015, 8 pgs.
International Search Report and Written Opinion, PCT/US2012/072201 dated Mar. 11, 2013, 11 pgs.
International Search Report and Written Opinion, PCT/IB2011003284 dated Feb. 4, 2013, 11 pgs.
USPTO Advisory Action for U.S. Appl. No. 13/629,437 dated Sep. 18, 2013, 3 pgs.
USPTO Final Rejection for U.S. Appl. No. 13/629,437 dated Apr. 10, 2013, 17 pgs.
USPTO Non Final Rejection for U.S. Appl. No. 13/247,779 dated Oct. 25, 2013, 15 pgs.
USPTO Non Final Rejection for U.S. Appl. No. 13/247,779 dated Jul. 8, 2014, 15 pgs.
USPTO Non Final Rejection for U.S. Appl. No. 13/629,437 dated Dec. 10, 2012, 15 pgs.
USPTO Notice of Allowance for U.S. Appl. No. 13/629,437 dated Oct. 29, 2013, 14 pgs.
USPTO Notice of Allowance for U.S. Appl. No. 13/629,437 dated Dec. 27, 2013, 13 pgs.

* cited by examiner

MULTI-PHASE SCANNING

RELATED APPLICATIONS

This application is a continuation of U.S. patent application Ser. No. 12/981,332, filed Dec. 29, 2010, entitled "Multi-Phase Scanning," which claims priority to U.S. Provisional Application No. 61/376,762, filed Aug. 25, 2010, each of which is incorporated by reference herein in its entirety.

TECHNICAL FIELD

Embodiments of the present invention relate to the field of user interface devices and, in particular, to multi-phase scanning of touch-sensing devices.

BACKGROUND

Computing devices, such as notebook computers, personal data assistants (PDAs), and mobile handsets, have user interface devices, which are also known as human interface devices (HID). One type of user interface devices that has become more common is touch-sensing devices, such as touch-sensor pads (also commonly referred to as touchpads), touch-sensor sliders, touch-sensor buttons, touch-sensor keyboard, touchscreens, and touch panels.

A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display.

Another user interface device that has become more common is a touch screen. Touch screens, also known as touchscreens, touch panels, or touchscreen panels are display overlays, which are typically pressure-sensitive (resistive), electrically sensitive (capacitive), acoustically sensitive (SAW—surface acoustic wave), or photo-sensitive (infra-red). The effect of such overlays allows a display to be used as an input device, removing the keyboard and/or the mouse as the primary input device for interacting with the display's content. Such displays can be attached to computers or, as terminals, to networks. There are a number of types of touch screen technology, such as optical imaging, resistive, surface wave, capacitive, infrared, dispersive signal, and strain gauge technologies. Touch screens have become familiar in retail settings, on point of sale systems, on ATMs, on mobile handsets, on game consoles, and on PDAs where a stylus is sometimes used to manipulate the graphical user interface (GUI) and to enter data.

In general, capacitance-sensing devices are intended to replace mechanical buttons, knobs, and other similar mechanical user interface controls. Capacitance-sensing devices eliminate the complicated mechanical switches and buttons, providing the reliable operation under harsh conditions. In addition, capacitance-sensing devices are widely used in the modern customer applications, providing new user interface options in the exiting products. Capacitive touch sensor elements can be arranged in the form of a sensor array for a touch-sensing surface. When a conductive object, such as a finger, comes in contact or close proximity with the touch-sensing surface, the capacitance of one or more capacitive touch sensor elements changes. An electrical circuit can measure the capacitance changes of the capacitive touch sensor elements. The electrical circuit, supporting one operation mode, converts the measured capacitances of the capacitive touch sensor elements into digital values.

There are two main operational modes in the capacitance-sensing circuits: self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as added by the finger touch capacitance is added to the sensor capacitance.

The mutual capacitance change is detected in the mutual capacitance-sensing mode. Each sensor element uses at least two electrodes: one is a transmitter (TX) electrode (also referred to herein as transmitter electrode) and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth).

BRIEF DESCRIPTION OF THE DRAWINGS

The present disclosure is illustrated by way of example, and not by way of limitation, in the figures of the accompanying drawings.

DETAILED DESCRIPTION

Figure 1:
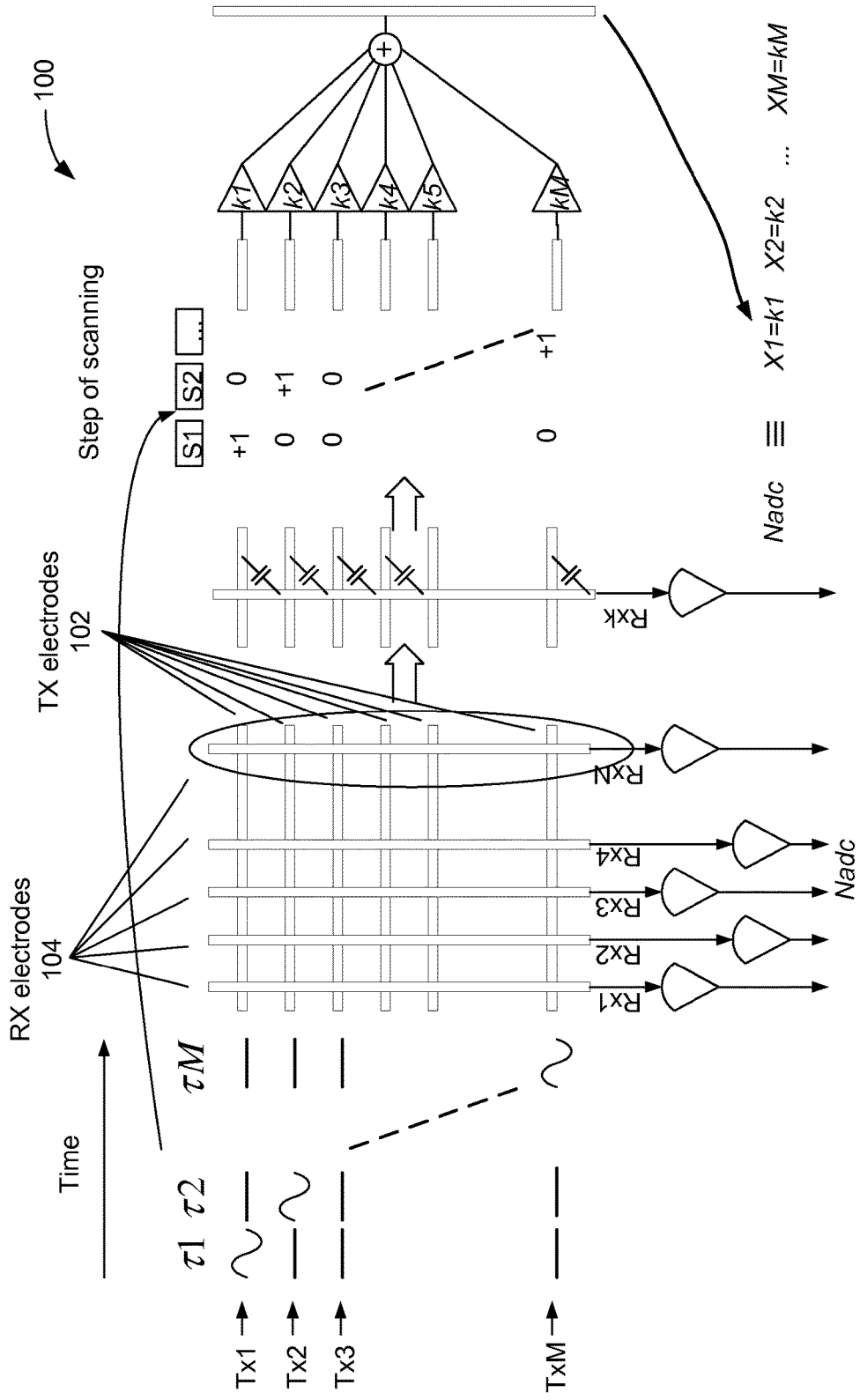
FIG. 1 illustrates normal scanning of a capacitance sensor matrix having M rows and N columns.

Apparatuses and methods of multi-phase scanning are described. In one embodiment, capacitance-sensing circuitry is configured to apply a first drive signal to a first transmitter (TX) electrode of a touch panel and a second drive signal to a second transmitter electrode of the touch panel during a first scanning stage. The second drive signal has at least one of a different amplitude, a different phase, a different frequency, or a different sequence than the first drive signal. In one embodiment, the capacitance-sensing circuitry applies a same drive signal to each of the transmitter electrodes during the scanning stages, but changes phase relations of the same drive signal for the transmitter electrodes during the scanning stages. The capacitance-sensing circuitry receives sense signals measured on receiver (RX) electrodes to detect a presence of an object on the touch panel. The sense signals represent capacitances of intersections of the transmitter and receiver electrodes. It should be noted that the capacitance-sensing circuitry can detect conductive objects, as well as other objects (also referred to as touch objects). An object, or touch object, is any object that disturbs the electrical field and reduces the coupling between the receiver and transmitter electrodes for the mutual capacitance sensing techniques. For example, if a user touches the touch surface wearing gloves, the capacitance-sensing circuitry may not detect the user's finger as a conductive object, but the capacitance-sensing circuitry can still detect the user's finger because the user's finger still disturbs the electrical field and reduces the coupling between the electrodes. It should also be noted that the embodiments described herein can be used on touch panels having more than two transmitter electrodes and receiver electrodes as described below.

The embodiments described herein provide an alternate TX drive technique for all-points-addressable (APA) panel scanning. This technique is based on applying the TX signal to all panel electrodes at a substantially same time and changing the individual TX electrode phases for different scanning stages. Alternatively, the technique may change the individual amplitudes, frequencies, or other signal properties to differentiate the signals being applied to the panel electrodes. In one embodiment, the multi-phase scanning uses the same scanning time as a conventional APA scanning scheme, but may provide better signal-to-noise ratio (SNR), as well as provide immunity to the external noise at same TX voltage, as compared to the conventional APA scanning scheme. The embodiments described herein may be used in various touch-sensing devices, including Indium Tin Oxide (ITO) based designs.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

References in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

FIG. 1 illustrates normal scanning of a capacitance sensor matrix having M rows and N columns according to one approach. In this normal scanning approach, a Tx signals is applied to the TX electrodes 102 in series between different panel scanning stages. For example, during a first scanning stage, a first Tx1 signal is applied to the first row electrode, and measure the sensor response in the RX column electrodes 104. During the first scanning stage, the other non-energized TX electrodes 102 are grounded. During a second scanning stage, a second Tx2 signal is applied to the second row electrode, while the other non-energized TX electrodes 102 are grounded. For simplification of the operation, when the TX signal is applied to the corresponding TX row, it is marked as +1, and when the TX electrode is grounded, it is marked as 0. Therefore, full panel scanning sequence corresponds to the moving "+1" between different TX electrodes during different scanning stages.

Any one receiver column could be represented as capacitive adder for TX excitation signals, passed via the touch panel. When this sequential scanning scheme applies only one TX signal to the one row electrode at the substantially same time, a receiver signal would be proportional to the mutual capacitance between excited row and receiver column only. This signal after demodulation and analog-to-digital conversion could be represented as some digital value, $N_{ADC}$.

For a matrix representing the intersections points of the panel electrodes (e.g., sensor matrix), the gain factor between j-row and i-column could be represented as $k_{ji}$, where k is proportional to the mutual capacitance between row and column, as represented in the following equation (1):

$$K = \begin{bmatrix} k_{11} & k_{12} & \ldots & k_{1M} \\ k_{21} & k_{22} & \ldots & k_{2M} \\ \ldots & \ldots & \ldots & \ldots \\ k_{N1} & k_{N2} & \ldots & k_{NM} \end{bmatrix} \quad (1)$$

As the TX signal is applied in series to the all panel rows, the elements of this matrix are found on a row-by-row basis, synchronously applying the TX signal to the corresponding row, as represented in the following equation (2):

$$V_{kj} = \delta_{kj}, \forall k \in \overline{1, M} \quad (2)$$

$$\delta_{kj} = \begin{cases} 1 & k = j \\ 0 & k \neq j \end{cases}$$

$V_{kj}$ is the TX signal for j row for the k scanning stage. For the whole panel scanning procedure, the TX signals could be represented by the following diagonal matrix with M*M dimensions in the following equation (3):

$$S = \begin{bmatrix} 1 & 0 & \ldots & 0 \\ 0 & 1 & \ldots & 0 \\ \ldots & \ldots & \ldots & \ldots \\ 0 & 0 & \ldots & 1 \end{bmatrix} \quad (3)$$

Each receiver electrode represents signals, coming from multiple TX electrodes, which can be expressed in the following equation (4) for the i-column receiver output signal and j-scanning stage:

$$N_{ADC\,ij} = \sum_{k=1}^{M} k_{ik} S_{kj} \quad (4)$$

Or in the matrix form:

$$N_{ADC} = K \cdot S \quad (5)$$

Taking into account the S is diagonal matrix, the linear equations set of the equation (5) is simplified to the following equation (6):

$$k_{ij} = N_{ADC\,ij}, \forall i \in \overline{1,N}, \forall j \in \overline{1,M} \quad (6)$$

So, calculating gain is directly proportional to the analog-to-digital converter (ADC) readings and do not require any additional computations. Assuming there are N receivers, so all columns are sensed at the substantially same time, and assuming the one row scanning time is $\tau$, the total panel scanning time $T_P$ is represented in the following equation (7):

$$T_P = \tau M \quad (7)$$

For the panels with large number of TX electrodes, one row scanning time is a small fraction the total panel scanning time. Because the row capacitances are measured during very short time interval, SNR degradation can result due to the limited number of TX cycles processing for the one row scanning. Other disadvantage of using the short conversion time is receiver bandwidth increasing, causing the external noise immunity degradation as would be appreciated by one of ordinary skill in the art having the benefit of this disclosure.

In order to get the row signal during whole panel scanning time Tp, the embodiments described herein apply TX signals more than one row at the substantially same time. If the same TX signals were applied to all TX electrodes, the touch detection would only be one dimensional. Thus, in order to have the ability to recover the mutual capacitance of each row-column intersection (or full matrix K), the embodiments described herein change one or more signal properties of the individual TX signal at the different scanning stages to distinguish signals during the different scanning stages to resolve one or more touches on the touch panel. The signal properties that can be changed are amplitude, phase, and/or frequency or other signal properties as would be appreciated by one of ordinary skill in the art having the benefit of this disclosure.

In some embodiments, the phase is changed for multi-phase scanning of the touch panel. In one embodiment, the multi-phase scanning changes the signal properties using binary phase modulation, as illustrated in FIG. 2.

Figure 2:
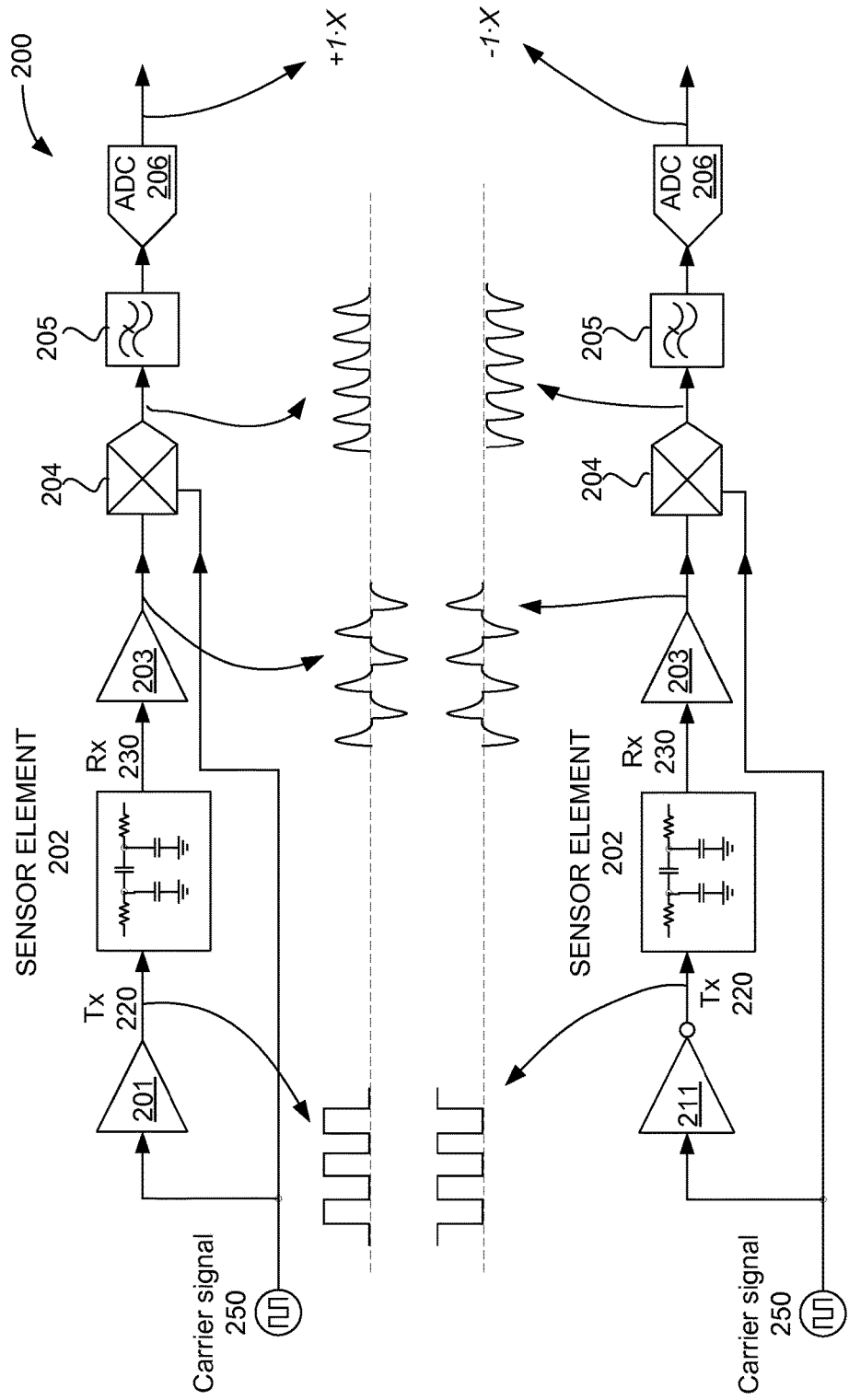
FIG. 2 illustrates one embodiment of a binary phase modulation circuit for multi-phase scanning according to one embodiment.

FIG. 2 illustrates one embodiment of a binary phase modulation circuit 200 for multi-phase scanning according to one embodiment. In this case, each of the TX electrodes 220 could be driven either in-phase to a carrier signal 250 or opposite phase to the carrier signal 250. FIG. 2 illustrates one sensing channel and one excited row illustration for the in-phase signal (+1·X) and for the opposite phase signal (−1·X). In the depicted embodiment, an internal or external source generates the carrier signal 250 having a carrier frequency. For the in-phase signal, a transmitter 201 receives the carrier signal 250 and drives one of the TX electrodes 220 with the carrier signal 250 to measure a capacitance on a sensor element 202. The capacitance of the sensor element 202 is the mutual capacitance between the one TX electrode 220 and an intersecting one of the RX electrodes 230. A receiver 203 receives a sense signal from the one RX electrode 230, the sense signal representing the mutual capacitance of the sensor element 202. The drive signal and the corresponding sense signal are illustrated in a waveform diagram of FIG. 2. A demodulator 204 receives the sense signal and the carrier signal 250, outputting a signal to be filtered by a filter 205, and converted into a digital value using the ADC 206. The in-phase circuitry produces an ADC response having a scalar factor of +1·X for the in-phase signal.

For the opposite phase signal, an inverter 211 receives the same carrier signal 250, inverts the carrier signal 250, and drives the TX electrodes 220 with an opposite phase signal to measure a capacitance on a sensor element 202. The capacitance of the sensor element 202 is the mutual capacitance between the one TX electrode 220 and an intersecting one of the RX electrodes 230. The receiver 203 receives a sense signal from the one RX electrode 230, the sense signal representing the mutual capacitance of the sensor element 202. The inverted drive signal and the corresponding sense signal are illustrated in the waveform diagram of FIG. 2. The demodulator 204 receives the sense signal and the carrier signal 250 (not inverted), outputting a signal to be filtered by a filter 205, and converted into a digital value using the ADC 206. The opposite phase circuitry produces an inverted ADC response having a scalar factor of −1·X for the opposite phase signal. For the following explanations, the binary phase modulation could be represented by the TX signal multiplication by scalar factor +1 or −1.

In this embodiment, the binary phase modulation circuitry 200 applies different TX phase sequence for different scanning stages and collects channel readings for each scanning stage. As illustrated and described with respect to FIG. 3, if multiple TX signals are driven at the substantially same time, a sense signal (from a RX electrode) is an algebraic sum of signals, coming from the different TX electrodes.

Although FIG. 2 illustrates binary phase modulation in the digital domain, the in-phase and opposite phase signals can be generated in the analog domain, such as described below with respect to FIG. 5A. For example, the opposite phase signal could be created using an amplifier having a negative one gain factor as would be appreciated by one of ordinary skill in the art having the benefit of this disclosure. The amplifier with commentary (balanced) outputs could be used for the in-phase and opposite phase signals generation.

Figure 3:
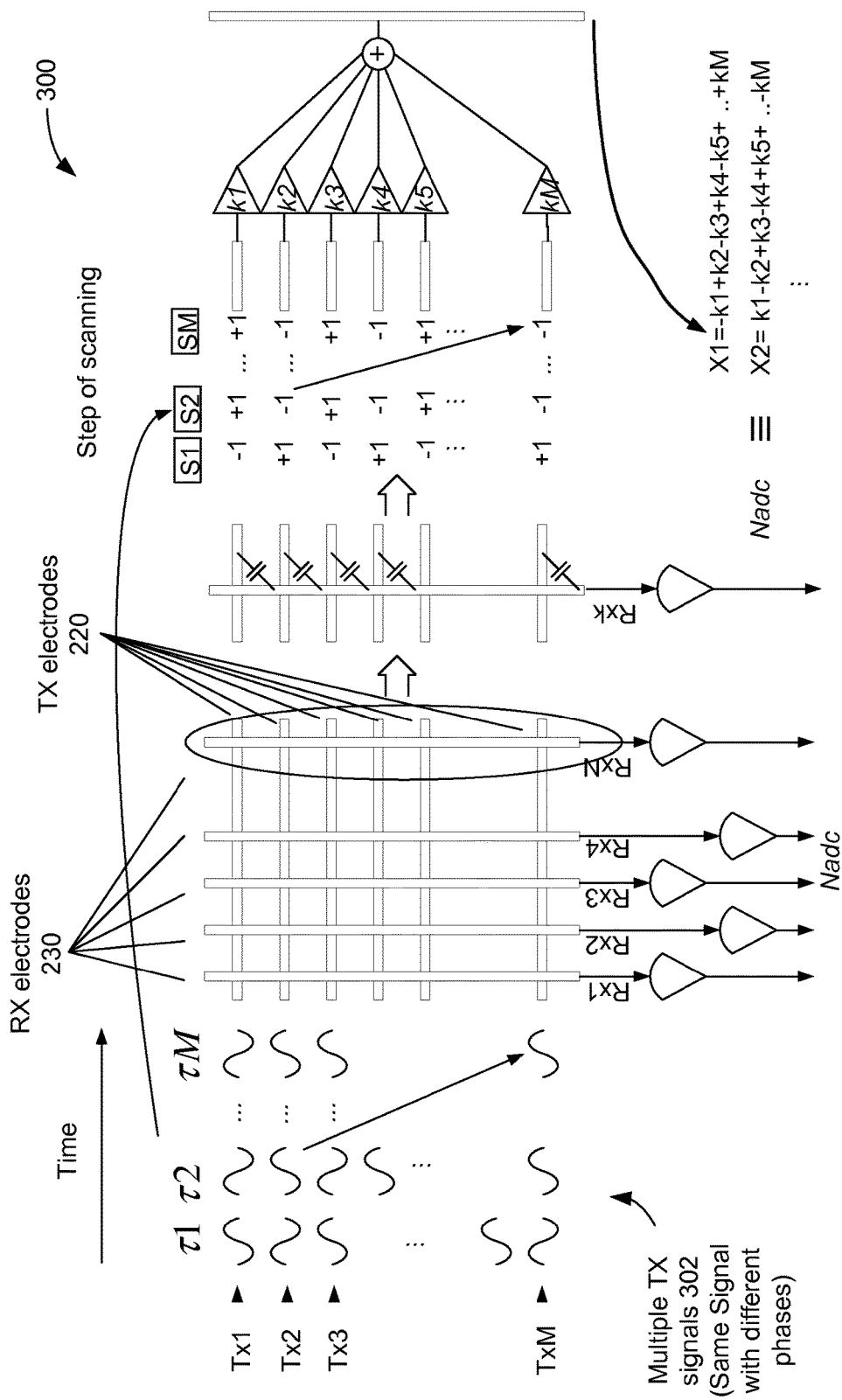
FIG. 3 illustrates multi-phase scanning of a capacitance sensor matrix having M rows and N columns in which multiple transmitter signals are driven at a substantially same time according to one embodiment.

FIG. 3 illustrates multi-phase scanning of a capacitance sensor matrix 300 having M row TX electrodes 220 and N column RX electrodes 230 in which multiple transmitter signals 302 are driven at the substantially same time according to one embodiment. The capacitance sensor matrix 300 may also be referred to an APA touch panel. The multiple rows and columns of the APA touch panel are each a rectangular shape, however, as would be appreciated by one of ordinary skill in the art having the benefit of this disclosure, other shapes may be used. For example, rows and columns of tessellated shapes may be used. It should also be noted that there are various layout patterns of APA touch panels for which the techniques described may be used as would be appreciated by one of ordinary skill in the art having the benefit of this disclosure.

In the depicted embodiment, suppose, the i TX electrode phase for the j scanning stage is equal to $F_{ij}$. $F_{ij}$ could accept only two values: $F_{ij}=1$ for the in-phase signals and $F_{ij}=-1$ for the opposite phase (e.g., opposite phase) signals, as all TX electrodes 220 are activated at substantially same time. The F in the matrix form could be represented in the following equation (8):

$$F = \begin{bmatrix} f_{11} & f_{12} & \cdots & f_{1M} \\ f_{21} & f_{22} & \cdots & f_{2M} \\ \cdots & \cdots & \cdots & \cdots \\ f_{M1} & f_{M2} & \cdots & f_{MM} \end{bmatrix} \quad (8)$$

There is easy to find the gain matrix K for the scanning sequence of phase modulated TX signals. By substituting the F matrix of equation (8) for the S matrix of equation (5), the following linear equation set (9) is obtained:

$$N_{ADC} = K \cdot F \quad (9)$$

By resolving the equation set (9) for the gain matrix K:

$$K = N_{ADC} \cdot F^{-1} \quad (10)$$

Where $F^{-1}$ is an inverse matrix of matrix F, could be found by any known method at the device design time, as matrix coefficients are constants and do not change during system operation. There is easy to estimate the computation requirements for the Equation (10) calculation: the $N_{ADC}$ is N*M matrix, $F^{-1}$ is M*M matrix. So, matrix multiplication requires $N*M^2$ multiply-accumulate (MAC) operations. For the panel, which has M=16 and N=11 it requires 2816 MAC operations each scanning cycle.

Figure 4:
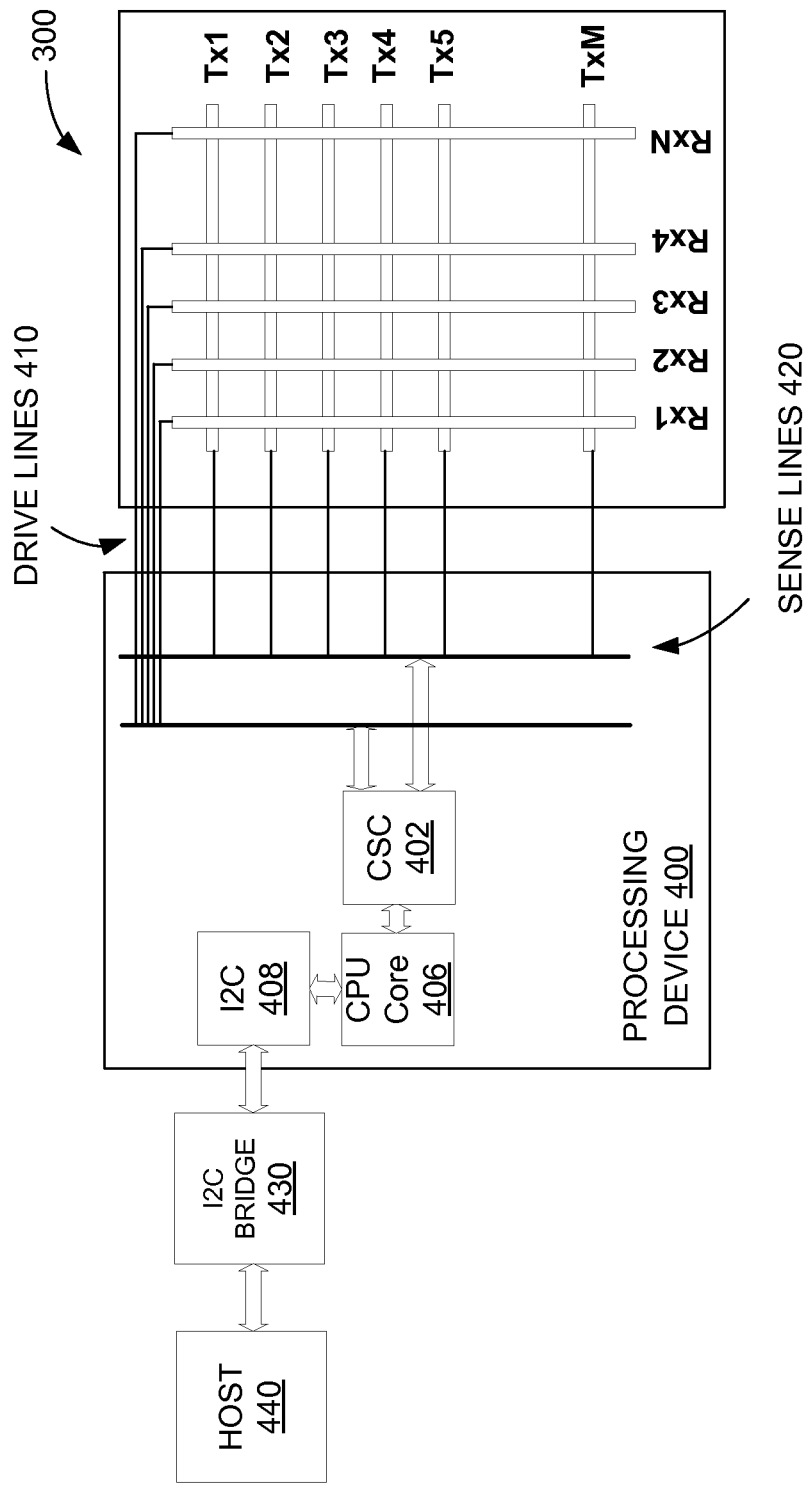
FIG. 4 is a block diagram of a processing device including capacitance-sensing circuitry for measuring mutual capacitance using the multi-phase scanning according to one embodiment.

FIG. 4 is a block diagram of a processing device 400 including capacitance-sensing circuitry (CSC) 402 for measuring mutual capacitance using the multi-phase scanning according to one embodiment. The processing device 400 includes the capacitance-sensing circuitry 402, a CPU core 406, and one or more communication interfaces, for example an I2C interface 408, which communicate with a host processing device 440 over an I2C bridge 430. Alternatively, other types of communication interfaces may be used to communicate with the host processing device 440. In other embodiments, the capacitance-sensing circuitry 402 may be implemented in other types of processing devices that have similar or dissimilar components as the processing device 400. In other embodiments, the CPU core 406 can communicate with the host processing device 440 using other communication devices and protocols than I2C as would be appreciated by those of ordinary skill in the art having the benefit of this disclosure. In some embodiments, the processing device 400 does not communicate with the host processing device 440 over the I2C bridge 430, but may communicate with other peripheral devices, or even no other external devices.

In this embodiment, the capacitance-sensing circuitry 402 measures the mutual capacitances of the sensor elements of the capacitance sensor matrix 300. As described above, the capacitance sensor matrix 300 has M row TX electrodes 220 and N column RX electrodes 230. Each intersection of the row TX electrodes 220 and the column RX electrodes 230 represents a sensor element. The capacitance-sensing circuitry 402 measures the mutual capacitances by applying multiple TX signals 302 on the drive lines 410 and receives sense signals on the sense lines 420. The capacitance-sensing circuitry 402 may use the measured capacitances to detect a presence of an object, as well as the location of the object, motion, speed, acceleration of the object. In one embodiment, the capacitance-sensing circuitry 402 measures the mutual capacitances and converts the mutual capacitances into digital values. In one embodiment, the capacitance-sensing circuitry 402 is configured to detect a single touch and corresponding gestures using the digital values. In other embodiments, the capacitance-sensing circuitry 402 is configured to detect multiple touches and corresponding multi-touch gestures using the digital values.

In another embodiment, the CPU core 406 can process the digital values received from the capacitance-sensing circuitry 402 to detect a presence of an object, movement of the objects, such as the object's speed, acceleration, and distance, as well as single and multi-touch gestures as would be appreciated by one of ordinary skill in the art having the benefit of this disclosure. The CPU core 406 can also be used to receive raw data from the capacitance-sensing circuitry 402 and to convert the raw data into digital values, etc. In another embodiment, the CPU core 406 sends the raw data to the host processing device 440 for processing.

In one embodiment, the host processing device 440 represents a processing device of one or more machines, such as a desktop computer, a laptop computer, other types of portable computers, a mobile device, a set-top box (STB), a personal data assistant (PDA), a server, a network router, a switch or bridge. In one embodiment, the processing device 400 is the PSoC® processing device offered by Cypress Semiconductor Corporation (San Jose, Calif.), such as described with respect to FIG. 7. Alternatively, the processing device 400 may be other types of processing devices as would be appreciated by those of ordinary skill in the art having the benefit of this disclosure. Alternatively, the capacitance-sensing circuitry 402 is integrated into the host processing device 440. Further, while only a single machine is illustrated for the host processing device 440, the term "machine" shall also be taken to include any collection of machines that individually or jointly execute a set (or multiple sets) of instructions to perform any one or more of the methodologies discussed herein. In other embodiments, an electronic system may include one or more host processing devices 440, processing devices 400, capacitance-sensing circuitry 402, as well as one or more peripheral devices.

Figure 5A:
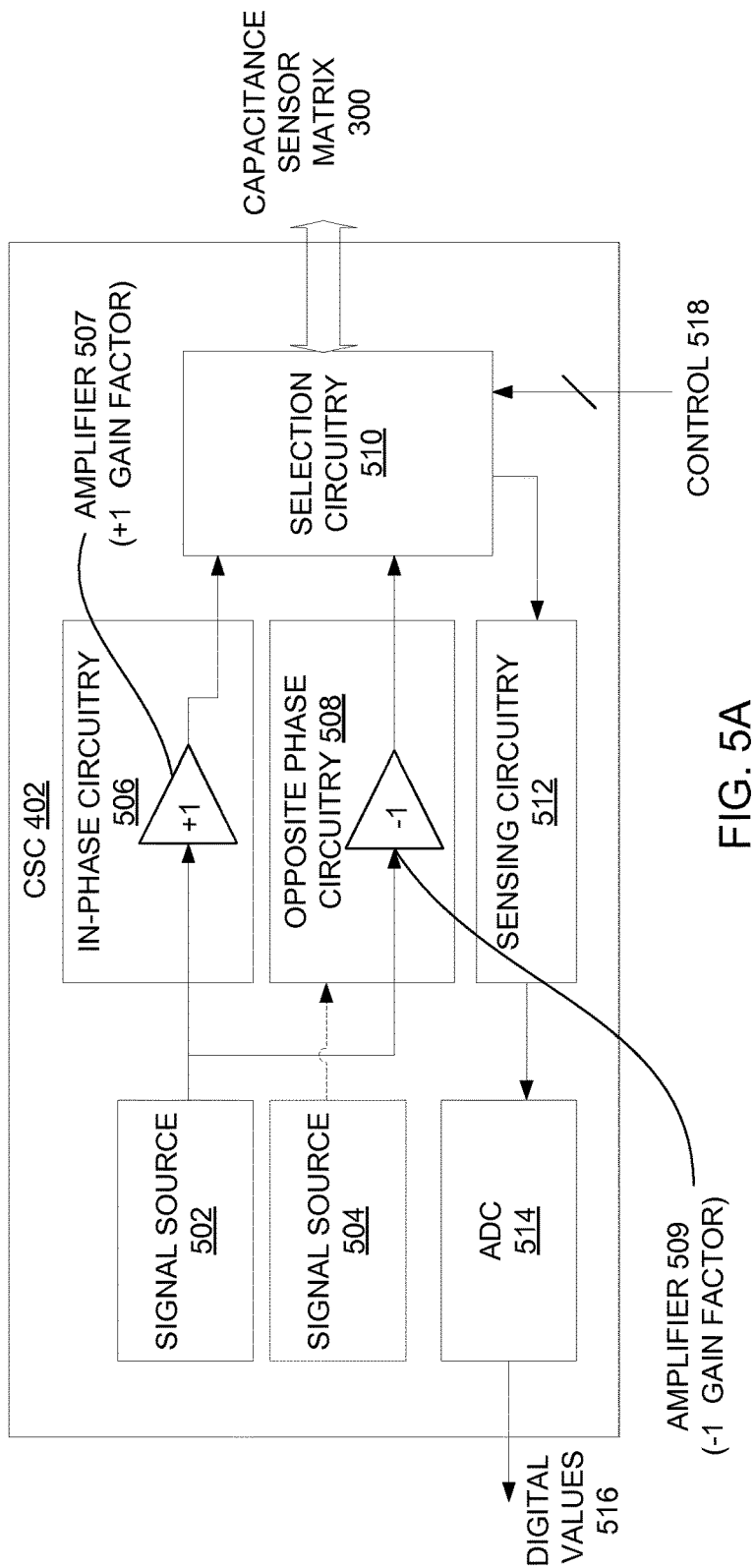
FIG. 5A is a block diagram of the capacitance-sensing circuitry of FIG. 4 according to one embodiment.

FIG. 5A is a block diagram of the capacitance-sensing circuitry 402 of FIG. 4 according to one embodiment. The capacitance-sensing circuitry 402 includes a first signal source 502, a second optional signal source 504, in-phase circuitry 506, opposite phase circuitry 508, selection circuitry 510, sensing circuitry 512, and ADC 514. The in-phase circuitry 506 receives a signal from the first signal source 502 and generates an in-phase signal to be applied to one or more TX electrodes of the capacitance sensor matrix 300. The opposite phase circuitry 508 may receive the same signal from the signal source 502 and generates an opposite phase signal to be applied to one or more TX electrodes of the capacitance sensor matrix 300.

The capacitance-sensing circuitry 402 may be implemented in the analog domain or digital domain. In one embodiment, the in-phase circuitry 506 is an analog circuit having an amplifier 507 with a +1 gain factor. The amplifier 507 is used to create an in-phase signal. In this embodiment, the opposite phase circuitry 508 is also an analog circuit having an amplifier 509 with a −1 gain factor. The amplifier 509 is used to create the opposite phase signal. In another embodiment, the optional signal source 504 can be used to generate a second signal that is already out of phase of the first signal. In this embodiment, the opposite phase circuitry 508 may not use an amplifier having a −1 gain factor. Alternatively, more than two signal sources can be used to generate multiple signals, including at least the in-phase signal and one or more opposite phase signals. In these embodiments, the signal sources 502 and 504 generate analog signals to be received by the in-phase circuitry 506 and the opposite phase circuitry 508. The signal sources 502 and 504 may be passive components that generate one or more carrier signals, having one or more frequencies. In other embodiments, the signal sources 502 and 504 may be components that are controlled externally, for example, by the CPU core 406 of the processing device 400. It should also be noted that the in-phase circuitry 506 may not include an amplifier, but could use other analog circuits to generate the in-phase signal as would be appreciated by one of ordinary skill in the art having the benefit of this disclosure.

In another embodiment, the in-phase circuitry 506 includes digital circuitry or digital processing logic configured to receive the first signal from the signal source 502 and to generate the in-phase signal, for example, using a digital buffer, or the like. In this embodiment, the opposite phase circuitry 508 includes an inverter that receives the same signal from the signal source 502, and inverts the signal to generate the opposite phase signal. In another embodiment, the second optional signal source 504 may be used to generate a second signal that can be used for the opposite phase signal as described above. In these embodiments, the signal sources 502 and 504 generate digital signals to be received by the in-phase circuitry 506 and the opposite phase circuitry 508. For example, the signal source 502 can generate a digital sequence (e.g., pseudorandom sequence) to be applied to the in-phase circuitry 506 and the opposite phase circuitry 508. Alternatively, the signal source 502 can provide a modulated digital signal. In another embodiment, the signal sources 502 and 504 generate analog signals and the in-phase circuitry 506 and the opposite phase circuitry 508 include analog-to-digital converters that convert the analog signals into digital signals. Like above, the signal sources 502 and 504 may be passive components that generate one or more carrier signals, having one or more frequencies. In other embodiments, the signal sources 502 and 504 may be components that are controlled externally, for example, by the CPU core 406 of the processing device 400.

In the depicted embodiment, the selection circuitry 510 receives the in-phase signal and the opposite phase signal and applies the appropriate signal to the TX electrodes of the capacitance sensor matrix 300. The selection circuitry 510 can be controlled externally, for example, one or more control signals 518 received from the CPU core 406. For example, a phase modulation function selection routine can be run on the CPU core 406 and the routine controls the selection circuitry 510 using the control signals 518. Alternatively, the selection circuitry 510 can be used to control which TX electrodes receive the in-phase signal and which TX electrodes receive the opposite phase signals. In the depicted embodiment, there are two signals: one in-phase signal and one opposite phase signal. In other embodiments, there may be more than two signals: one in-phase signal and multiple opposite phase signals.

In one embodiment, the selection circuitry 510 includes one or more multiplexers that can be controlled to select the appropriate signal for the appropriate TX electrodes. In one embodiment, the selection circuitry 510 is configured to select alternating ones of the TX electrodes to receive the in-phase signal, and the other alternating ones of the TX electrodes to receive the opposite phase signal. Alternatively, the selection circuitry 510 can drive the TX electrodes in other patterns as described herein, as well as in other patterns as would be appreciated by one of ordinary skill in the art having the benefit of this disclosure.

In the depicted embodiment, the selection circuitry 510 is also coupled to the sensing circuitry 512. The sensing circuitry 512 is configured to receive sense signals from the RX electrodes of the capacitance sensor matrix 300. The sense signals represent the mutual capacitances at the respective intersections of the panel electrodes. In one embodiment, the sensing circuitry 512 includes analog circuits or digital circuitry or digital processing logic that is configured to measure the capacitance. For example, in one embodiment, the sensing circuitry 512 includes analog circuitry to measure the current associated with each of the RX electrodes. The sensing circuitry 512 provides the measured values to the ADC 512 to be converted to the digital values 516. The capacitance-sensing circuitry 402 provides the digital values to the CPU core 406 or the host processing device 440 as described above.

In one embodiment, the capacitance-sensing circuitry 402 is configured to drive the TX electrodes 320 using a phase modulation function selection. For example, the F matrix coefficients could be selected in the multiple ways to form the non-singular matrix. There are several criterion that can be used for the phase modulation function selection: 1) The matrix should be a well-defined matrix for getting stable linear solution set; 2) The matrix coefficients determine the filter properties of the system, so matrix could be selected in such way to get best filtering properties. 3) The receiver input current at "no touch" may be minimized. 4) There is desirable to have close to constant receiver current for the different scanning stages if receiver has limited dynamic range.

Figure 5B:
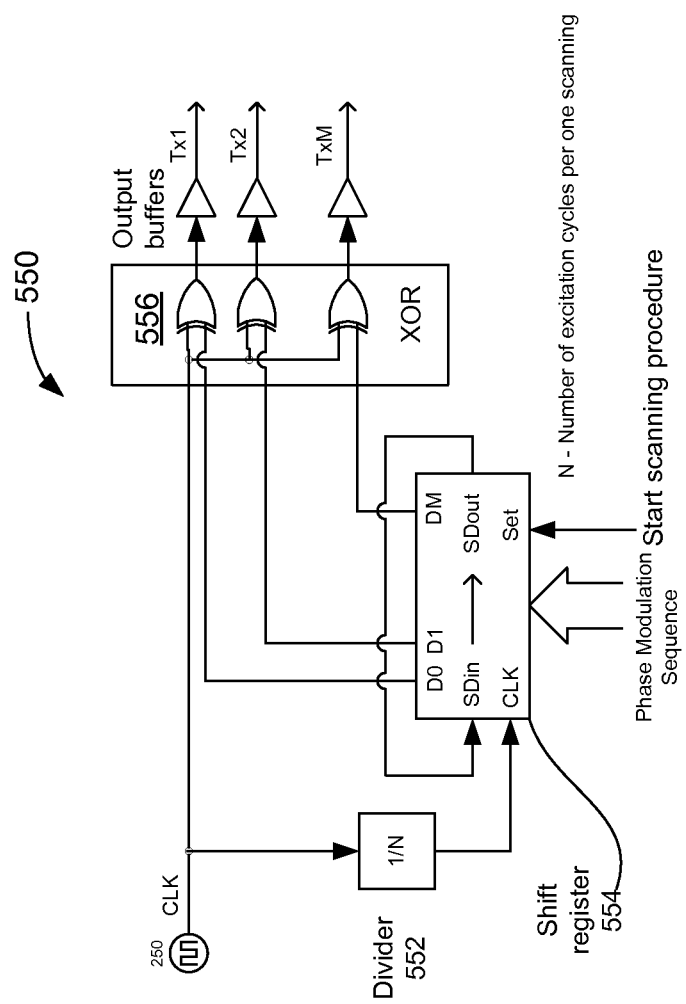
FIG. 5B is block diagram of the sequence generation circuitry according to one embodiment.

FIG. 5B is block diagram of a sequence generation circuitry 550 according to one embodiment. The sequence generation circuitry 550 includes a programmable divider 552, a shift register 554, and an array of the XOR gates 556, which are used for the binary phase change of the TX signals. At the initialization phase, the sequence is loaded in the shift register 554. For each N cycles, a clock pulse for the shift register 554 is generated, which shifts the sequence on the outputs. Each register output is connected to the second XOR gate input. Common clock signal is applied to the first XOR gate input. Depending on the register output state, XOR gate passes the clock signal with inversion or without inversion, forming different multi-phase output signals.

There are multiple ways for the phase matrix filling. In one embodiment, the selecting function uses a pseudorandom sequence of the +1, −1 and rotating this sequence during the multiple scanning stages for the complete matrix filling. For example, if we select the following sequence, for M=10:

$$\overline{F_V} = [-1, +1, -1, -1, +1, +1, -1, -1, -1, +1] \quad (11)$$

The full matrix F could be filed by the cyclic rotation of $F_V$ sequence:

$$F = \begin{pmatrix} -1 & 1 & -1 & -1 & 1 & 1 & -1 & -1 & -1 & 1 \\ 1 & -1 & 1 & -1 & -1 & 1 & 1 & -1 & -1 & -1 \\ -1 & 1 & -1 & 1 & -1 & -1 & 1 & 1 & -1 & -1 \\ -1 & -1 & 1 & -1 & 1 & -1 & -1 & 1 & 1 & -1 \\ -1 & -1 & -1 & 1 & -1 & 1 & -1 & -1 & 1 & 1 \\ 1 & -1 & -1 & -1 & 1 & -1 & 1 & -1 & -1 & 1 \\ 1 & 1 & -1 & -1 & -1 & 1 & -1 & 1 & -1 & -1 \\ -1 & 1 & 1 & -1 & -1 & -1 & 1 & -1 & 1 & -1 \\ -1 & -1 & 1 & 1 & -1 & -1 & -1 & 1 & -1 & 1 \\ 1 & -1 & -1 & 1 & 1 & -1 & -1 & -1 & 1 & -1 \end{pmatrix} \quad (12)$$

The inverse matrix looks as follows:

$$F^{-1} = \begin{pmatrix} -0.1932 & -0.0795 & -0.2386 & -0.2159 & -0.1477 & 0.0568 & 0.1705 & 0.0114 & 0.0341 & 0.1023 \\ 0.1023 & -0.1932 & -0.0795 & -0.2386 & -0.2159 & -0.1477 & 0.0568 & 0.1705 & 0.0114 & 0.0341 \\ 0.0341 & 0.1023 & -0.1932 & -0.0795 & -0.2386 & -0.2159 & -0.1477 & 0.0568 & 0.1705 & 0.0114 \\ 0.0114 & 0.0341 & 0.1023 & -0.1932 & -0.0795 & -0.2386 & -0.2159 & -0.1477 & 0.0568 & 0.1705 \\ 0.1705 & 0.0114 & 0.0341 & 0.1023 & -0.1932 & -0.0795 & -0.2386 & -0.2159 & -0.1477 & 0.0568 \\ 0.0568 & 0.1705 & 0.0114 & 0.0341 & 0.1023 & -0.1932 & -0.0795 & -0.2386 & -0.2159 & -0.1477 \\ -0.1477 & 0.0568 & 0.1705 & 0.0114 & 0.0341 & 0.1023 & -0.1932 & -0.0795 & -0.2386 & -0.2159 \\ -0.2159 & -0.1477 & 0.0568 & 0.1705 & 0.0114 & 0.0341 & 0.1023 & -0.1932 & -0.0795 & -0.2386 \\ -0.2386 & -0.2159 & -0.1477 & 0.0568 & 0.1705 & 0.0114 & 0.0341 & 0.1023 & -0.1932 & -0.0795 \\ -0.0795 & -0.2386 & -0.2159 & -0.1477 & 0.0568 & 0.1705 & 0.0114 & 0.0341 & 0.1023 & -0.1932 \end{pmatrix} \quad (13)$$

By looking at the inverse matrix of equation (13), one can see interesting properties of inverse matrix, formed by the cyclic rotation of the sequence of equation (11). For example, the inverse matrix coefficients are obtained by the cyclic rotation of the one matrix row or column, requiring the minimum read-only memory (ROM) area for storage. This matrix could be normalized to be implemented on the integer computation by the CPU core 406, or by the host processing device 440.

The $F_V$ can be selected in such way that the different operation phases can easily be distinguished. Using a phase modulation sequence is close to the pseudo-random process and cyclic process time shift allows obtaining the phase modulation sequences, which have minimum cross-correlation functions and provide stable solution of the linear equation (10). Therefore, the cross-correlation coefficient between different phase modulation sequences should be much smaller than autocorrelation function peak. When using cyclic phase modulation sequence rotation, this sequence autocorrelation function should have minimum side peaks and a large signal peak.

Figure 6A:
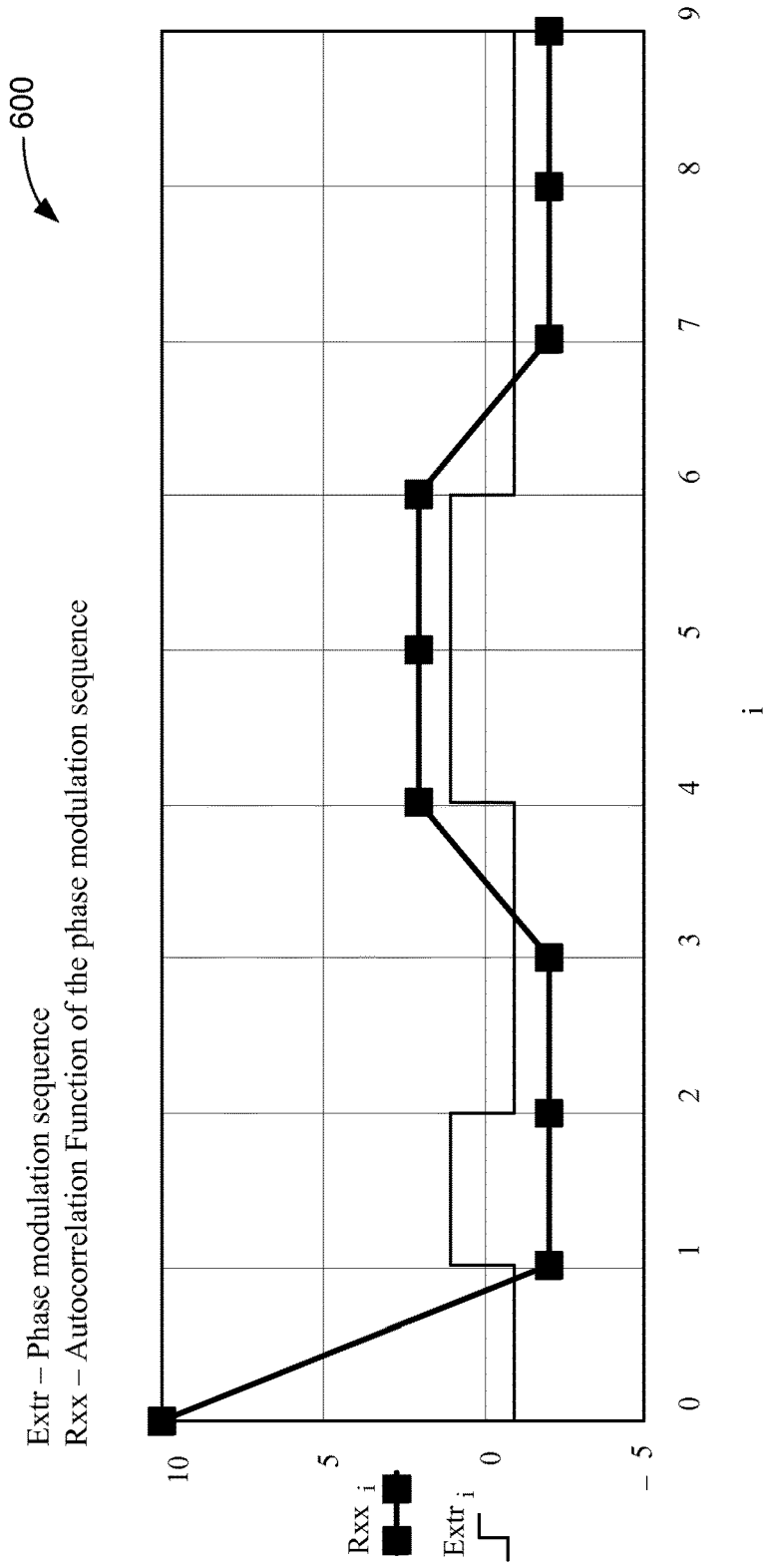
FIG. 6A illustrates an autocorrelation function for a discrete function of a pseudorandom sequence according to one embodiment.

FIG. 6A illustrates an autocorrelation function 600 (Rxx) for a discrete function of a pseudorandom sequence (Extr). In particular, FIG. 6A shows the autocorrelation function for the discrete function of equation (11). These functions are well known functions from spread-spectrum communication systems, e.g. Barker codes or M Sequences. The preliminary investigations show the number of '+1' and '−1' should be different to form definite matrix.

There are multiple other ways for the phase matrix filling. In one embodiment, the phase matrix is filled using orthogonal sequences. In the second embodiment, the phase matrix is filled using Walsh functions, complementary sequences, or the like. The selection criterion can be based on the orthogonal sequences generations. In one embodiment, the phase matrix can be filled to have constant sum of elements for receivers with limited dynamic range.

Figure 6B:
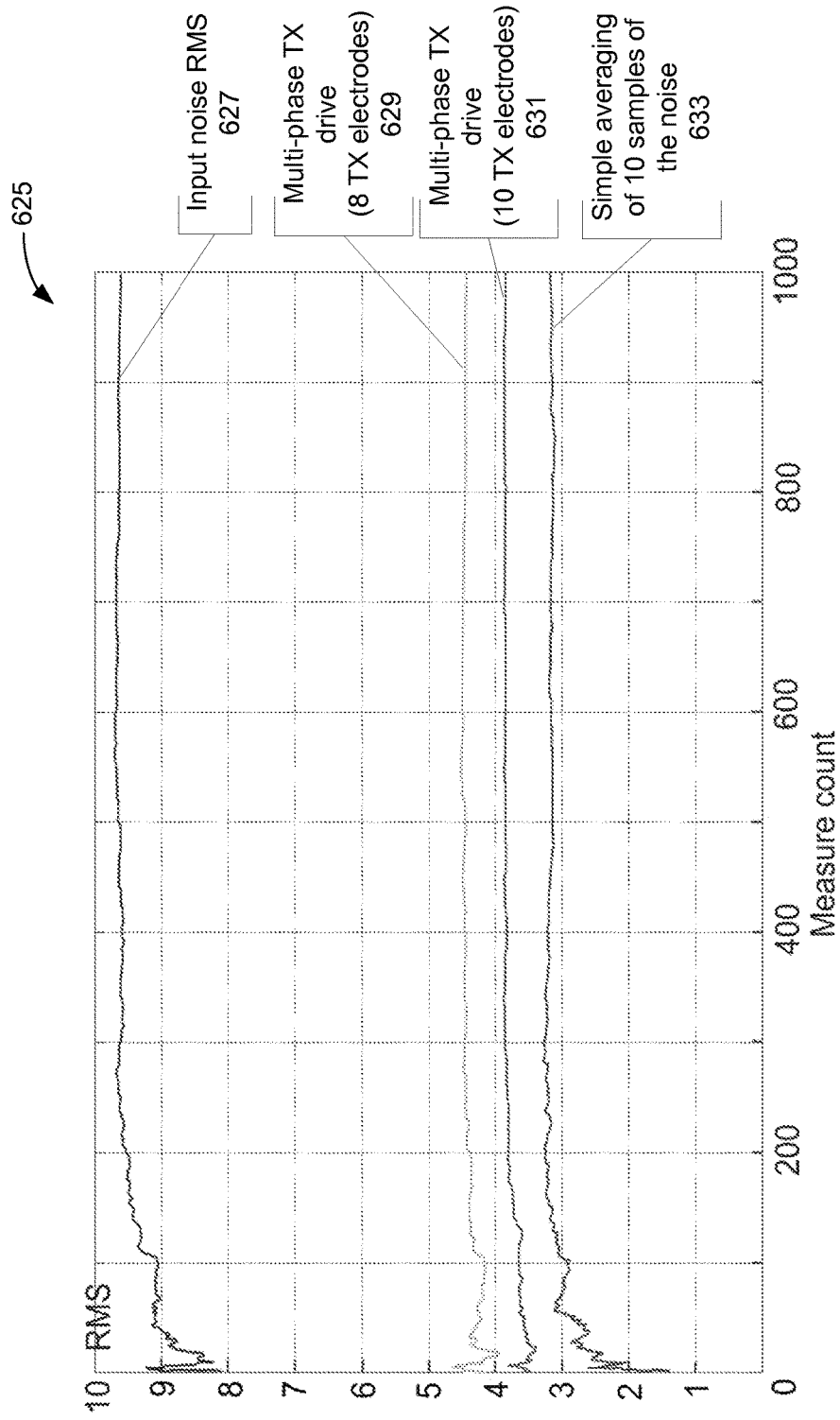
FIG. 6B is a graph illustrating white noise response for multi-phase scanning according to one embodiment.

FIG. 6B is a graph 625 illustrating white noise response for multi-phase scanning according to one embodiment. The graph 625 includes the simulated white noise response, including the root mean square (RMS) noise value versus the sample point number for the following signal processing schemes: 1) input noise RMS 627 (direct noise passing); 2) multi-phase TX drive scanning 629 for a touch panel with 8 TX electrodes (M=8); 3) multi-phase TX drive scanning 631 for a touch panel with 10 TX electrodes (M+10); and 4) simple averaging 633 of the 10 samples of the noise. As shown in FIG. 6B, the multi-phase scanning technique provides white noise immunity improvement around 2 times for the panels with 8 TX electrodes and around 2.5 times for the panels with 10 TX electrodes. As expected, the simple averaging provides improvement some more 3.3 times noise immunity improvement.

Figure 6C:
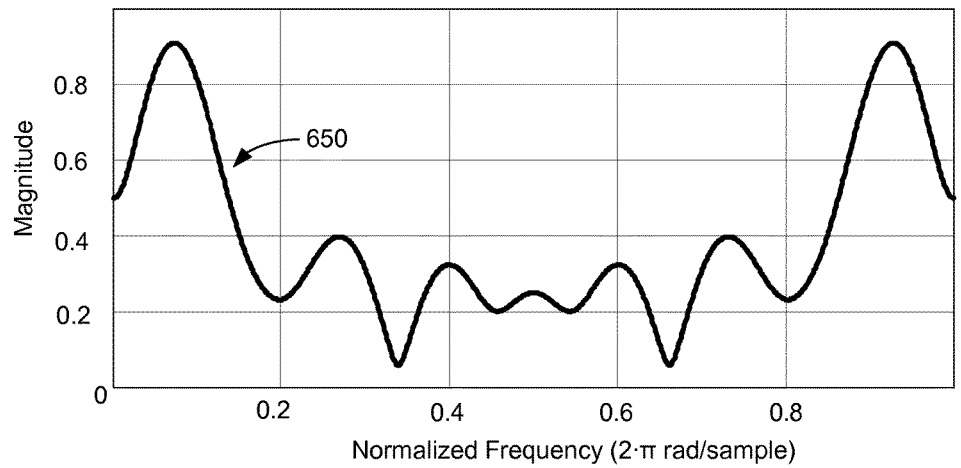
FIG. 6C is a graph of a frequency response of the multi-phase scanning according to one embodiment.

The channel frequency characteristic is changed when multi-phase TX drive technique is used. For the noise propagation, the post-processing algorithm acts as a finite impulse response (FIR) filter, connected after receiver channels. FIG. 6C is a graph of a frequency response 650 of the multi-phase scanning according to one embodiment. As shown in FIG. 6C, this FIR filter acts as LPF filter, providing additional noise attenuation. The filter frequency response is varied by changing the phase modulation sequence type so that different types of sequences have different filtering abilities.

Table 1-1 includes manual-finger-test results comparing conventional scanning and multi-phase scanning.

TABLE 1-1

| Configuration | Touch signal | Noise, counts | SNR |
|---|---|---|---|
| Conventional | 54 | 15 | 3.6 |
| Multi-phase TX Drive | 44 | 4 | 11 |

Table 1-2 includes test results for a white noise immunity test, comparing conventional scanning and multi-phase scanning.

TABLE 1-1

| Input noise, Vpp | Configuration | Touch signal, counts | Noise, counts | SNR(touch signal/noise) | Improvement Ratio |
|---|---|---|---|---|---|
| 5 | Conventional | 22 | 45 | 0.49 | 1 |
|   | Multi-phase TX | 21 | 18 | 1.16 | 2.36 |
| 4 | Conventional | 22 | 35 | 0.63 | 1 |
|   | Multi-phase TX | 21 | 14 | 1.5 | 2.38 |
| 3 | Conventional | 22 | 22 | 1 | 1 |
|   | Multi-phase TX | 21 | 12 | 1.83 | 1.83 |
| 2 | Conventional | 22 | 16 | 1.375 | 1 |
|   | Multi-phase TX | 21 | 7 | 3 | 2.18 |
| 1 | Conventional | 22 | 8 | 2.75 | 1 |
|   | Multi-phase TX | 21 | 4 | 5.25 | 1.9 |

Figure 6D:
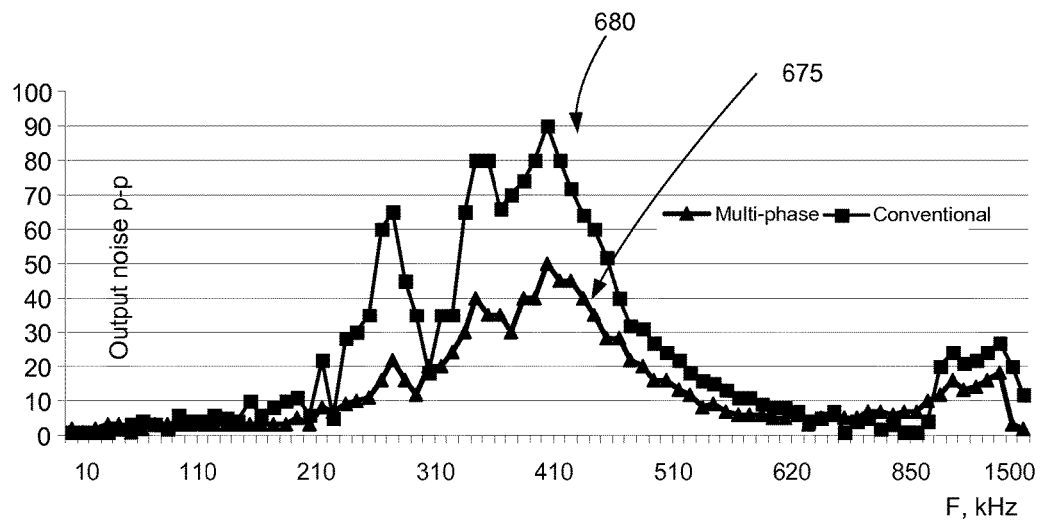
FIG. 6D is a graph illustrates an improvement of noise immunity of the multi-phase scanning and conventional scanning according to one embodiment.

FIG. 6D is a graph illustrates an improvement of noise immunity of the multi-phase scanning 675 and conventional scanning 680 according to one embodiment. In this embodiment, to show noise immunity for narrow band noise signals, a 1 Vpp sinusoidal wave noise interference was swept in frequency band from 10 kHz to 1400 kHz, and the operation frequency of the multi-phase scanning is around 400 kHz. As shown in FIG. 6D, the multi-phase scanning 675 has around two times better noise immunity as compared to the conventional scanning.

The embodiments described above use an inverse matrix solving methods. In other embodiments, other solving methods may be used. In other embodiments, Barker codes or complementary sequences may be used as other solving methods as described below with respect to FIG. 9 et seq. Unlike inverse matrix solving methods, the Barker codes and complementary sequences may not require fractional MAC operations and can be implemented on processor that are able to perform additions and subtractions calculations only in the time efficient way.

Figure 7:
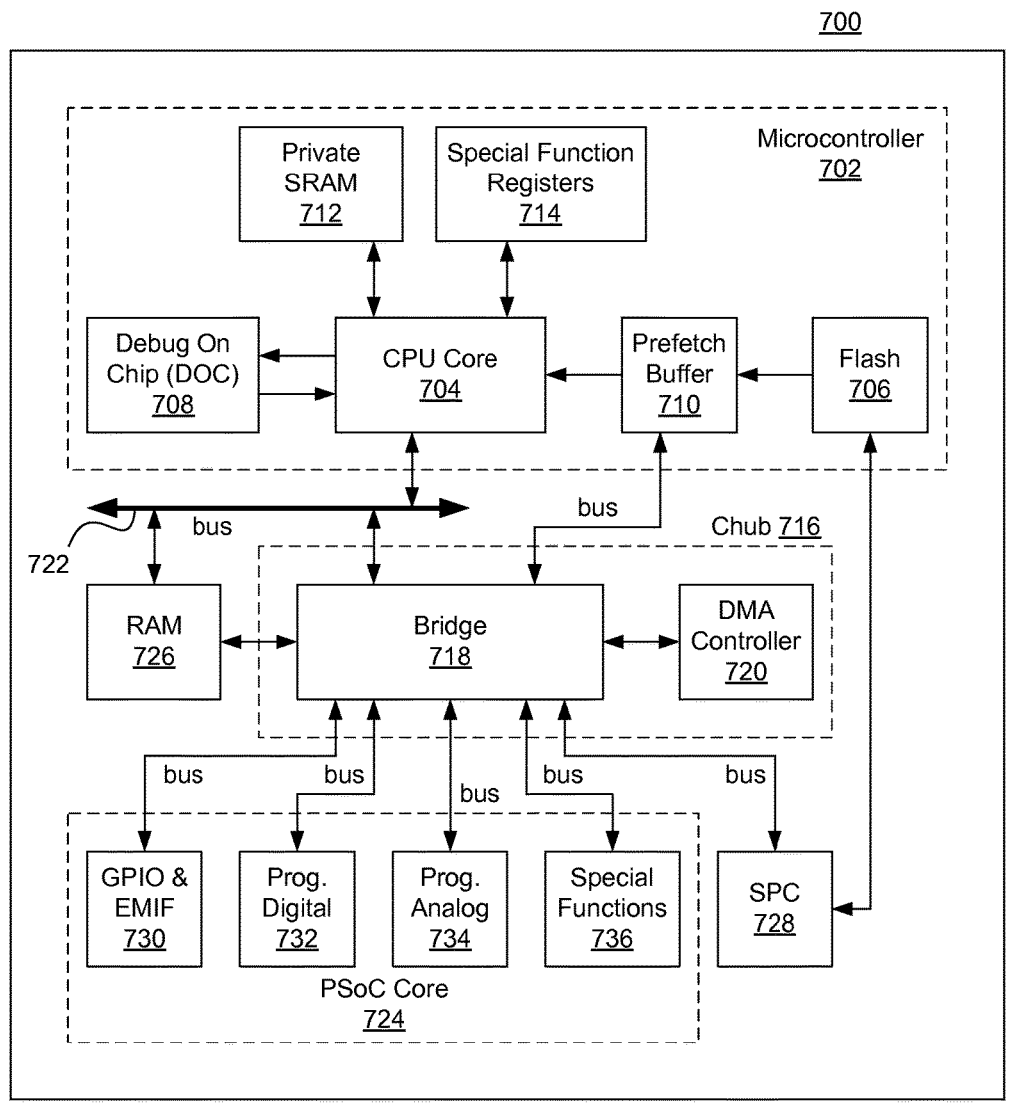
FIG. 7 illustrates an embodiment of a core architecture of the Programmable System-on-Chip (PSoC®) processing device.

FIG. 7 illustrates an embodiment of a core architecture 700 of the PSoC® processing device, such as that used in the PSoC3® family of products offered by Cypress Semiconductor Corporation (San Jose, Calif.). In one embodiment, the core architecture 700 includes a microcontroller 702. The microcontroller 702 includes a CPU (central processing unit) core 704, flash program storage 706, DOC (debug on chip) 708, a prefetch buffer 710, a private SRAM (static random access memory) 712, and special functions registers 714. In an embodiment, the DOC 708, prefetch buffer 710, private SRAM 712, and special function registers 714 are coupled to the CPU core 704, while the flash program storage 706 is coupled to the prefetch buffer 710.

The core architecture 700 may also include a CHub (core hub) 716, including a bridge 718 and a DMA controller 720 that is coupled to the microcontroller 702 via bus 722. The CHub 716 may provide the primary data and control interface between the microcontroller 702 and its peripherals and memory, and a programmable core 724. In one embodiment, the capacitance-sensing circuitry 402 of FIG. 2 may be implemented in the core architecture 700, such as part of the programmable core 724. The DMA controller 720 may be programmed to transfer data between system elements without burdening the CPU core 704. In various embodiments, each of these subcomponents of the microcontroller 702 and CHub 716 may be different with each choice or type of CPU core 704. The CHub 716 may also be coupled to shared SRAM 726 and an SPC (system performance controller) 728. The private SRAM 712 is independent of the shared SRAM 726 that is accessed by the microcontroller 702 through the bridge 718. The CPU core 704 accesses the private SRAM 712 without going through the bridge 718, thus allowing local register and RAM accesses to occur simultaneously with DMA access to shared SRAM 726. Although labeled here as SRAM, these memory modules may be any suitable type of a wide variety of (volatile or non-volatile) memory or data storage modules in various other embodiments.

In various embodiments, the programmable core 724 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 724 includes a GPIO (general purpose IO) and EMIF (extended memory interface) block 730 to provide a mechanism to extend the external off-chip access of the microcontroller 702, a programmable digital block 732, a programmable analog block 734, and a special functions block 736, each configured to implement one or more of the subcomponent functions. In various embodiments, the special functions block 736 may include dedicated (non-programmable) functional blocks and/or include one or more interfaces to dedicated functional blocks, such as USB, a crystal oscillator drive, JTAG, and the like.

The programmable digital block 732 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 732 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 704) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 734 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 134 may support various analog functions including, but not limited to, analog routing, LCD drive IO support, capacitance-sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

Figure 8:
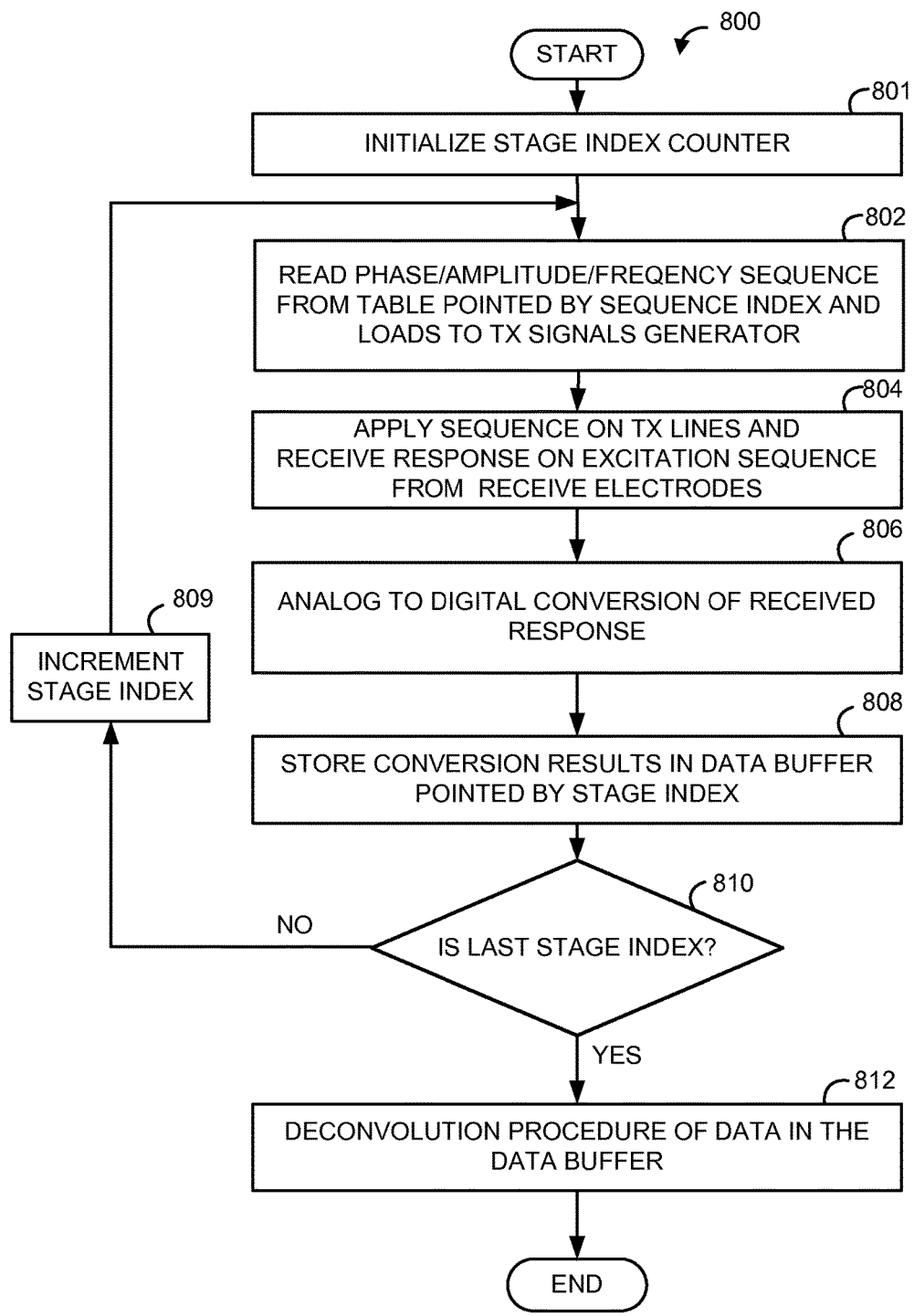
FIG. 8 is a flow diagram of one embodiment of a method for multi-phase scanning.

FIG. 8 is a flow diagram of one embodiment of a method for multi-phase scanning. In some embodiments, processing logic may be used to perform the method 800. The processing logic may include hardware, software, or any combination thereof. In one embodiment, the processing device 400 of FIG. 4 performs the method 800. In another embodiment, the capacitance-sensing circuitry 402 of FIG. 4 performs the method 800. Alternatively, other components may be used to perform some or all of the operations of the method 800. Processing logic starts from stage index counter 801 initialization (block 801). At block 802, the processing logic reads phase, amplitude or frequency information for the TX line signals from table and loads signal generation parameters to TX signal generators. At block 804, processing logic applies predefined TX signal sequences to TX electrodes and sense responses from receive electrodes at substantially same time. At block 806, processing logic performs analog to digital conversion of received responses once conversion stage is complete. The conversion results are stored in data buffer (block 808). The stage index is checked in block 810. Once all scanning stages were complete, stage index reaches predefined value. In this case the deconvolution procedure is initiated in block 812. In the opposite case stage index is incremented in block 809 and blocks 802-810 are executed again.

It should be noted that modifications of the execution flow in the different may be made in other embodiments of the present invention embodiments. For example, some invention embodiments could execute blocks 802 and 804 in parallel by using multiple analog-to-digital conversion channels. There is possible different organization of the deconvolution procedure. Taking into account deconvolution procedure takes multiple iterations, it could be reorganized on multiple steps and each step is executed once result of individual conversion stage is available. This implementation gives benefits in overall execution time, as deconvolution could be executed in parallel with scanning.

In another embodiment, the processing logic applies a first drive signal to a first TX electrode during a scanning stage, and applies a second drive signal to a second TX electrode during the same scanning stage. During the first scanning stage, the processing logic receives a first sense signal on a first RX electrode, and receives a second sense signal on a second RX electrode. The first and second sense signals represent the mutual capacitances on the respective intersections. Next, processing logic converts the measured capacitances to digital values. Next, the processing logic determines if there are additional scanning stages. If not, the process ends; otherwise, the processing logic returns to perform multi-phase scanning in a subsequent scanning stage.

In a further embodiment, during a second scanning stage, the processing logic applies the second drive signal to the first TX electrode, and applies the first drive signal to the second TX electrode. This may be repeated for a number of scanning stages that is equal to the number of TX electrodes. For example, if there were 16 TX electrodes, the processing logic repeats sending the first drive signal and second drive signal to alternating ones of the TX electrodes for 16 scanning stages.

In another embodiment, during the second scanning stage, the processing logic applies a third drive signal to the first TX electrode, and applies the first drive signal to the second TX electrode. The third drive signal has at least one of a different amplitude, a different phase, a different frequency, or a different sequence than the first and second drive signals. The processing logic may then apply the third drive signal to the second TX electrode during the a third scanning stage.

In another embodiment, the processing logic applies the first drive signal to alternating ones of the TX electrodes, and applies the second drive signal to the other alternating ones of the TX electrodes. This can be repeated during a number of multiple scanning stages that is equal to the number of TX electrodes. In these embodiments, the processing logic receives the sense signals from the RX electrodes, where the sense signals are indicative of capacitances of intersections between the TX and RX electrodes. The processing logic detects presences of zero (no touch) or more (single touch or multiple touches) on the touch panel using the capacitances.

In another embodiment, processing logic applies a same drive signal to each of the TX electrodes of a touch panel during multiple scanning stages, and changes phase relations of the same drive signal for the TX electrodes during the scanning stages. For example, the processing logic changes the individual phases of the drive signal to be applied to each of the TX electrodes. The processing logic receives sense signals from RX electrodes to detect a presence of an object on the touch panel. The sense signals represent capacitances of intersections of the TX electrodes and RX electrodes. In one embodiment, in order to change the phase relations during a first scanning stage, the processing logic applies the drive signal having a first phase to a first TX electrode, and applies the same drive signal having a second phase to a second TX electrode. In one embodiment, the second phase is an opposite phase of the first phase (e.g., 0 and 180 degrees). In another embodiment, the second phase is a different phase, but not an opposite phase. In one embodiment, the processing logic then applies the same drive signal having the second phase to the first TX electrode during a second scanning stage, and applies the same drive signal having the first phase to the second TX electrode during the second stage. In another embodiment, the processing logic applies the same drive signal having a third phase to the first TX electrode during the second stage, and applies the same drive signal having the first phase to the second TX electrode. Then, during a third scanning stage, the processing logic applies the same drive signal having the third phase to the second TX electrode. Alternatively, the processing logic can apply the same drive signal, and change the phases of the respective signals in other patterns as would be appreciated by one of ordinary skill in the art having the benefit of this disclosure.

In one embodiment, the processing logic uses binary phase modulation to perform the method in which the processing logic receives or generates a carrier signal as the same drive signal. The processing logic applies the carrier signal to the first TX electrode as the first phase signal, inverts the carrier signal to generate the second phase signal, and applies the inverted signal (i.e., second phase signal) to the second TX electrodes. In this embodiment, the carrier signal is the in-phase drive signal, and the inverted signal is the opposite phase drive signal.

In another embodiment, the processing logic selects a pattern for the phase relations for the TX electrodes, and drives each of the TX electrodes with either the in-phase drive signal or the opposite phase drive signal according to the pattern. In another embodiment, the processing logic selects a pseudorandom sequence having a number of "one" and "negative one" values. The "one" values correspond to the in-phase drive signal and the "negative one" values correspond to the opposite phase values, and the number of values in the pseudorandom sequence is equal to the number of TX electrodes. The processing logic applies either the in-phase drive signal or opposite phase drive signal to the TX electrodes according to the pseudorandom sequence. This is done in one scanning stage, and then the processing logic rotates the pseudorandom sequence in subsequent scanning stages, and applies either the in-phase or opposite phase drive signals to the TX electrodes according to the rotated pseudorandom sequence in the subsequent scanning stages.

In one embodiment, the processing logic applies in-phase drive signals to alternating ones of the TX electrodes, and, at the substantially same time, applies opposite phase drive signals to the other alternating ones of the TX electrodes, such as illustrated in FIG. 3. Alternatively, the processing logic can applies in-phase and one or more opposite phase signals to the TX electrodes in other patterns as would be appreciated by one of ordinary skill in the art having the benefit of this disclosure.

In the embodiments described herein, the multi-phase TX drive method (i.e., multi-phase scanning) allows noise immunity improvement for the white and narrow band noise by several times without increasing the TX voltage. The multi-phase scanning may provide the same noise immunity improvement for the noise caused by a liquid crystal display (LCD). This noise improvement may increases with an increased number of panel transmitter electrodes driven at substantially same time M, increasing approximately as $M^{1/2}$. It should be noted that the multi-phase scanning may have higher computations requirements ($N*M^2$ MAC operations for every scan). The multi-phase scanning may also increase power consumption due to driving the TX electrodes at the substantially same time, and may increase the RX electrode current. If we use special phase sequences and decoding techniques, the MAC operations could require execution only addition and subtraction operations.

It should be noted that FIG. 8 describes two signals being applied to the TX electrode arrays, and that all RX electrodes can be sensed at the substantially same time. In other embodiments, different phase, amplitude, or frequency signals can be applied to more than one TX electrodes at the substantially same time, such as applying the in-phase signal to alternating ones of the TX electrodes and applying the opposite phase signal to the other alternating ones of the TX electrodes. In other embodiment, more than one receiver signal can be sensed at the substantially same time or in series as would be appreciated by one of ordinary skill in the art having the benefit of this disclosure.

The following description considers the pseudo-random phase modulation sequences which do not need multiplication operations for the touch surface reconstruction. As described above in equation (9), the results of measurement of the sensors matrix reaction to an excitation can be expressed in the following equation (14), $$N_{ADC} = K \cdot F; \tag{14}$$

where K is the gain matrix of the sensors matrix, and F is the matrix of excitation signals. The matrix of excitation signals consists of components ±1 and can be represented in the following form:

$$F = \begin{pmatrix} f_{11} & f_{12} & \cdots & f_{1M} \\ f_{21} & f_{22} & \cdots & f_{2M} \\ \cdots & \cdots & \cdots & \cdots \\ f_{M1} & f_{M2} & \cdots & f_{MM} \end{pmatrix} \tag{15}$$

In this matrix, the number of a row specifies the signal position in time and a column number—the signal position in space. So, a row represents a combination of signals which is sent to the sensors matrix simultaneously, and a column represents a succession of excitation signals in time. To provide the equal scanning time at traditional scanning and scanning with simultaneous exciting the condition M=N is to be executed. This means that the matrix must be square.

It is worth noting that the gain matrix can be represented as a sum of the base matrix and disturbance matrix as expressed in the following equation:

$$K = Kb + k = \begin{pmatrix} Kb_{11} & Kb_{12} & Kb_{1M} \\ Kb_{21} & Kb_{22} & Kb_{2M} \\ & & \\ Kb_{N1} & Kb_{N2} & Kb_{NM} \end{pmatrix} + \begin{pmatrix} k_{11} & k_{12} & k_{1M} \\ k_{21} & k_{22} & k_{2M} \\ & & \\ f_{N1} & f_{N2} & f_{NM} \end{pmatrix} \tag{16}$$

Here, the informative parameter carrying the information about introducing excitation after a touch is the disturbance matrix k. This means that value Kb does not need to be solved.

In the embodiments described above, the method of the excitation signals matrix is described which is oriented to the complete task solution by finding the inverse task (solving the inverse matrix). The main drawback of this approach is a necessity to use vast calculation resources to solve the complete task and decrease the effectiveness of noise impedance reduction, as compared to the simple averaging if the components of the decision solving matrix $F^{-1}$ have different weights.

In one embodiment, the following criteria can be set for the matrix F: 1) The sum of a row cells is to be constant for all the rows. This condition appears due to the procedure of the measuring channel calibration (e.g., additive correction of the signal from the phase demodulator to reduce the dynamical range of the converting signal being transformed). If this condition is not met, it may be necessary either to cancel additive correction or the procedure of defining the coordinates of the disturbance place in the sensors matrix may be complicated/become unreliable. Alternatively, it may need the individual baseline calibration values for the each scanning stage. 2) The procedure of processing measurement results is to be minimized to adding/subtracting operations. First of all this condition is aimed at providing the maximum reduction in noises influence. In this case the reduction efficiency will be $\sqrt{N}$.

The Walsh and Hadamard matrixes may be used to correspond to the second criterion. For these matrixes it is justified:

$$H \cdot H^T = W \cdot W^T = n \cdot I \quad (17)$$

where n is the matrix size and I is the identity matrix (unit matrix).

It is sufficient to multiply the matrix of measurement results obtained because of excitation by one of these matrixes by the transposed excitation matrix. As these matrixes contain only components ±1, it is enough to perform simple adding/subtracting operations to solve the complete task. However, these matrixes application may complicate or may make impossible the calibration procedure of the measuring channel if measurement channel has limited input signals dynamic range. The reason for this can be the fact that the sum of these matrixes row/column cells is n or 0 for different rows, as input current varies in times during different sensing phases.

Circulant matrixes that are created by cyclic permutation of a certain vector exactly may be used to correspond to the first criterion. These matrixes are created due to cyclic permutation of a certain reference vector Fref. The permutation direction and permutation object (row/column) are not important.

$$Fref = (f_1, f_2 \ldots f_M); F = \begin{pmatrix} f_1 & f_2 & \ldots & f_M \\ f_M & f_1 & \ldots & f_{M-1} \\ \vdots & \vdots & \ddots & \vdots \\ f_2 & f_3 & \ldots & f_1 \end{pmatrix}. \quad (18)$$

It should be noted that circulant matrixes can be used in the embodiments above, however, using an enveloped matrix $F^{-1}$ would be a condition under which they can be used. This means that the complete task solution is supposed. The main drawback of such an approach can be considered the fact that matrix $F^{-1}$ cells differ from ±1. So, to solve the complete task it is necessary to perform a great number of MAC operations (e.g., $n^2$—for each receiver or $n^3$—for the sensors matrix of n×n size). Besides, with non-unit cells of $F^{-1}$ matrix an improvement in Signal-Noise Ratio (SNR) may be smaller than it is possible theoretically $\sqrt{n}$ for n-elements averaging. The following embodiments may not need the usage of MAC operations.

In one embodiment, a correlation method is used. In this embodiment, suppose Fref is a pseudo random periodical sequence of values ±1 and its auto correlation function is the Kronecker delta-function.

$$Rxx(pc) = n \cdot \delta(pc). \quad (19)$$

where pc is a cell position in a row (the column number). The matrix can be represented as follows:

$$Rxx = Fref \cdot F^T. \quad (20)$$

Mutual correlation function of reference vector Fref with excitation matrix F rows can be expressed as follows:

$$Rxy(pc, pr) = n \cdot \delta(pc - pr). \quad (21)$$

where pr is the row number. Mutual correlation function of the reference vector with the excitation matrix can be represented in the matrix shape as:

$$Rxy = F \cdot F^T = n \cdot I. \quad (22)$$

So, if matrix F is used to excite the sensors matrix (14), the sensors matrix gain value can be found as:

$$Kx = \frac{N_{ADC} \cdot F^T}{n}. \quad (23)$$

Figure 9:
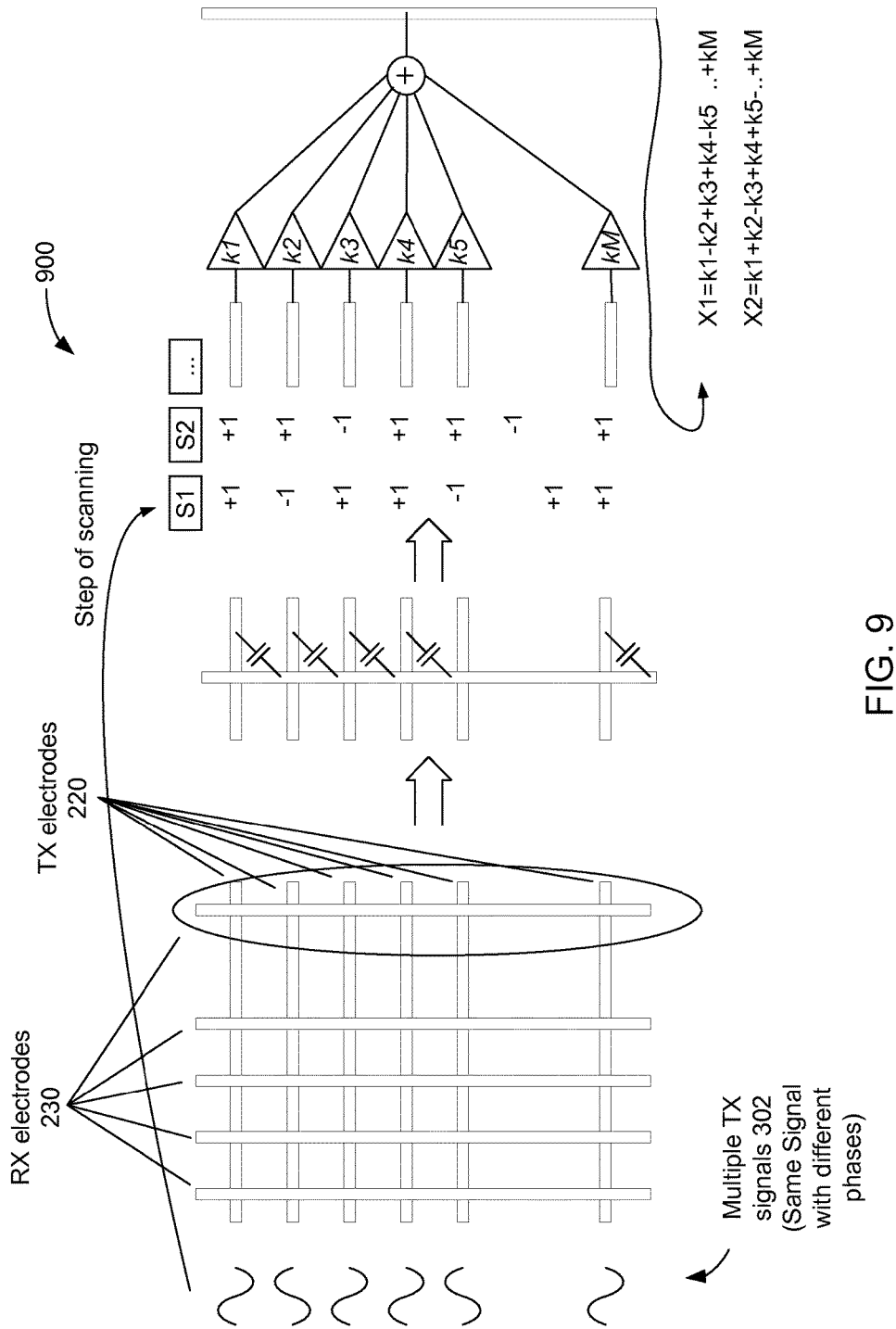
FIG. 9 illustrates multi-phase scanning of a capacitance sensor matrix having M rows and N columns in which multiple transmitter signals are driven at a substantially same time according to another embodiment.

Suppose the sensors matrix scanning process is organized in the way that excitation signals are sent to the rows and the receivers are connected to the columns, such as illustrated in FIG. 9. FIG. 9 illustrates a capacitance sensor matrix having M rows and N columns in which multiple transmitter signals are driven at the substantially same time according to another embodiment. Suppose that the scanning procedure starts with sending reference sequence Fref to the rows. The reference sequence is a pseudo random periodical sequence. The result of measuring the reaction to this excitation in the sensors matrix column m can be expressed as follows:

$$N_{ADC}[m, 1] = \sum_{i=0}^{n-1} Fref[i] \cdot K[m, i]. \quad (24)$$

The measurement results for scanning s can be expressed as follows:

$$N_{ADC}[m, s] = \sum_{i=0}^{n-1} K[m, i] \cdot Fref[i - s]. \quad (25)$$

Gain values can be estimated from the measurement results in the following way:

$$Kx[m, s] = \frac{1}{n} \cdot \sum_{i=0}^{n-1} N_{ADC}[m, i] \cdot Fref[i - s]. \quad (26)$$

As vector Fref components contains only cells ±1 the mathematical processing of these results is minimized to simple adding/subtracting of the measurement results.

The procedure of excitation of the sensors matrix can be regarded as scanning the spacious-distributed system by the peak of auto correlation function Rxx(0) of reference random sequence. The state of these spacious structure components is found by correlation of the system response with the reference sequence image (26).

It is worth noting that statement (19) is justified for very long sequences and Walsh sequences. Short sequences only approach the delta-function and may have values fluctuations outside the correlation peak—non-zero sidelobes. Sidelobes availability may significantly distort values K calculation results.

Expression (27) is expressed as follows, considering expression (16):

$$N_{ADC}[m, s] = \sum_{i=0}^{n-1} (Kb[m, i] + k[m, i]) \cdot Fref[i - s]. \quad (27)$$

Taking into account that Kb is a constant value expression (27) can be expressed in the following way:

$$N_{ADC}[m,s] = Kb \cdot \sum_{i=0}^{n-1} Fref[i-s] + \sum_{i=0}^{n-1} k[m,i] \cdot Fref[i-s]. \quad (28)$$

So, the measurement result consists of two parts. The constant part is defined by the still matrix gain multiplied by the value of the reference sequence components sum. The variable part depends on the state of disturbance (spacious position and the disturbance value) and the state of the scanning sequence.

According to (26), the calculated value Kx can be expressed in the following equation (29):

$$Kx[m,s] = \sum_{j=0}^{n-1}\left(Kb \cdot \sum_{i=0}^{n-1} Fref[i-s]\right) \cdot Fref[j-s] + \quad (29)$$

$$\sum_{j=0}^{n-1}\left(\sum_{i=0}^{n-1} k[m,i] \cdot Fref[i-s]\right) \cdot Fref[j-s]$$

Or as the following equation (30):

$$Kx[m,s] = Kb \cdot \sum_{i=1}^{n} Rxx[i-s] + \sum_{i=1}^{n} k[m,i] \cdot Rxx[i-s] \quad (30)$$

Kx defined in this way contains the constant part which is proportional to the invariable (base) gain level and the variable which is created by additive imposition of excitations in the rows multiplied by the value of the reference sequence auto correlation function in the position of scanning. So, if Rxx is not the delta-function, the result of these excitations definition is distorted.

In one embodiment, the sensor matrix is excited by the reference vector:

$$\overline{Fref} = [-1,+1,-1,-1,+1,+1,-1,-1,-1,+1] \quad (31)$$

Its auto correlation function Rxx is depicted in FIG. 6A. It can be seen in FIG. 6A that Rxx has sidelobes with the amplitude of ±2. Still, the inverse matrix exists for the circular matrix built on its base.

Figure 10A:
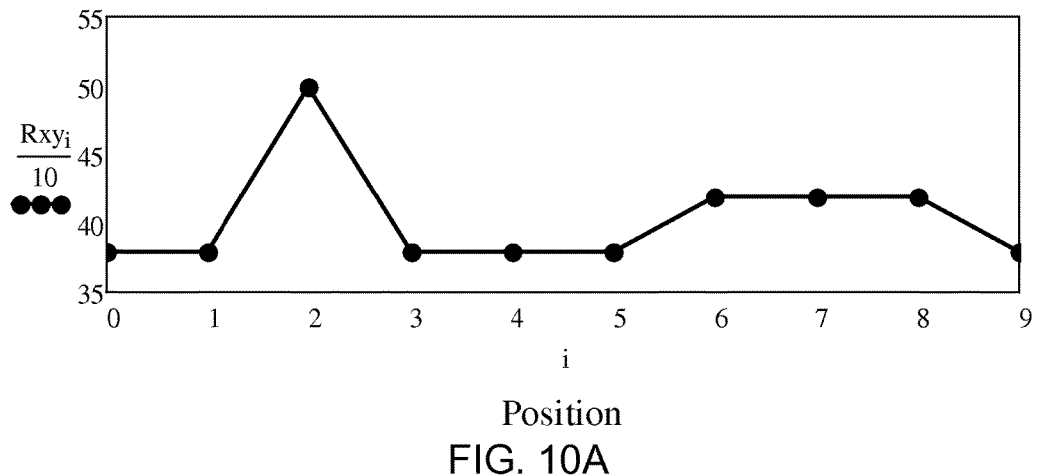
FIG. 10A illustrates a mutual correlation function using a reference vector according to one embodiment.
Figure 10B:
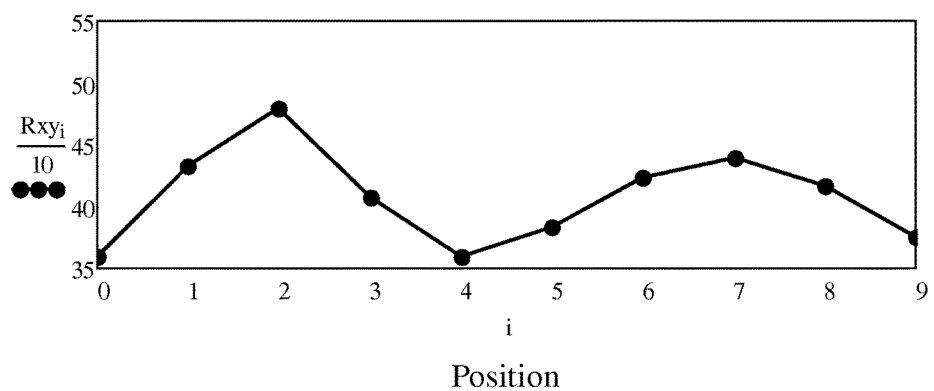
FIG. 10B illustrates a mutual correlation function using another reference vector according to another embodiment.

Suppose Kb=100 and there is excitation $k_{m,2}$=10 in the third row. After having done calculation according to equation (26), the mutual correlation function of the measurement results with reference vector is obtained, as illustrated in FIG. 10A. In the calculation results, there is the correlation peak available which is proportional to the disturbance and a phantom spike caused by inequality Rxx beyond the correlation peak. However, if there are excitations in other positions the results obtained will be significantly distorted. For example, if $k_{m,1}$=6 $k_{m,2}$=10 $k_{m,3}$=4 a (big touch), the results will be obtained as shown in FIG. 10B. The correlation between the useful signals has been saved but a significant phantom spike has appeared. The conclusion is that using short pseudo random sequences with big sidelobes in the systems with the correlation method of detecting the disturbance position can give wrong touch coordinate calculation results.

There is the class of short pseudo random sequences, where sidelobes within ±1. These sequences (codes) are Barker codes. The known Barker codes are tabulated in Table 1-3.

TABLE 1-3

Known Barker Codes

| Length | Codes | Σ |
|---|---|---|
| 2 | +1 −1           +1 +1 | 0/2 |
| 3 | +1 +1 −1 | 1 |
| 4 | +1 +1 −1 +1         +1 +1 +1 −1 | 2 |
| 5 | +1 +1 +1 −1 +1 | 3 |
| 7 | +1 +1 +1 −1 −1 +1 −1 | 1 |
| 11 | +1 +1 +1 −1 −1−1 +1 −1 −1 +1 −1 | −1 |
| 13 | +1 +1 +1 +1 +1−1 −1 +1 +1 −1 +1 −1 +1 | 5 |

Figure 11A:
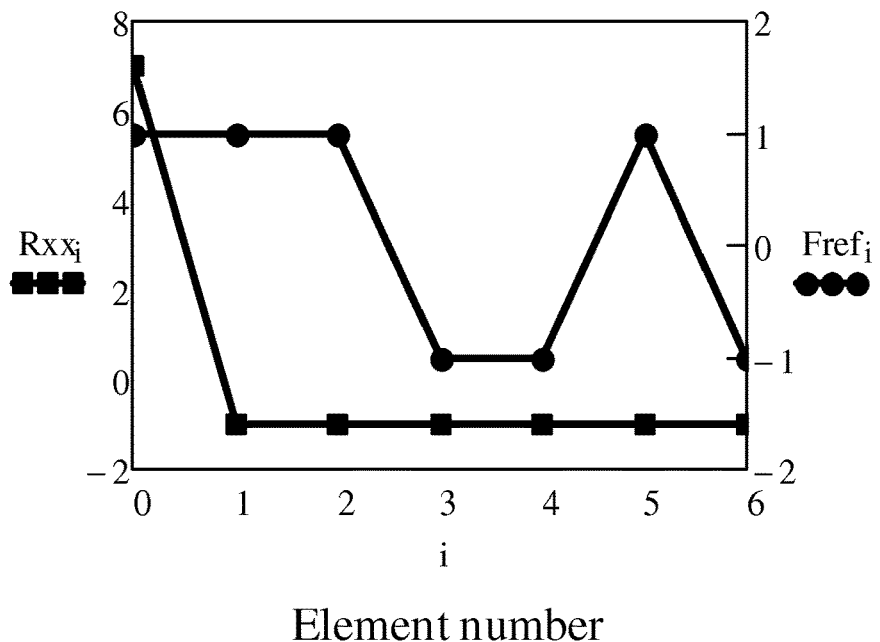
FIG. 11A illustrates an autocorrelation function of seven elements of Barker Code according to one embodiment.
Figure 11B:
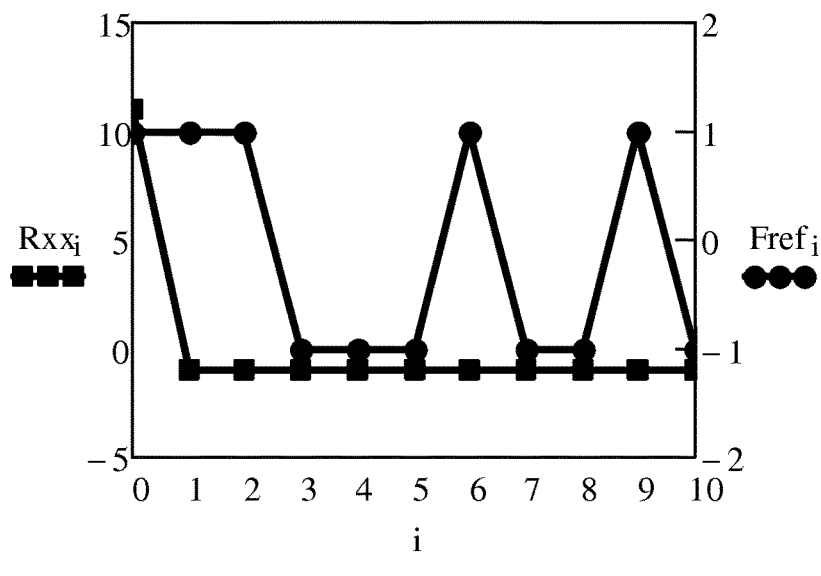
FIG. 11B illustrates an autocorrelation function of eleven elements of Barker code according to one embodiment.

The value of Barker code components sum is available in column 1. FIG. 11A illustrates the auto correlation function for sequences with a length of 7 elements of Barker Code, and FIG. 11B illustrates the autocorrelation for 11 elements. These auto correlation functions are characterized by absence of value variation beyond the correlation peak. This means that the right part of expression (30) is not going to produce any phantoms and distortion ratio between the correlation peaks.

Figure 12A:
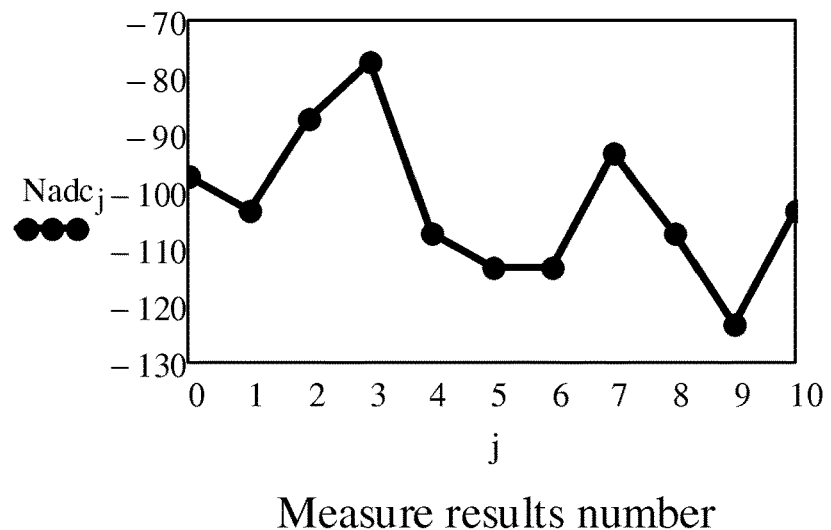
FIG. 12A illustrates measurement results of the reference vector according to one embodiment.
Figure 12B:
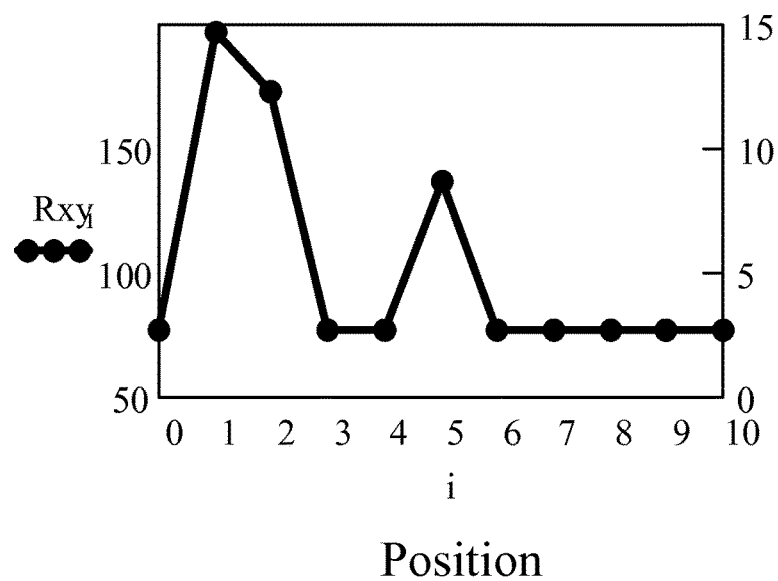
FIG. 12B illustrates the mutual correlation function of the reference vector according to one embodiment.

In another embodiment, the sensor matrix is excited by the reference sequence shaped as Barker code 11 elements long (e.g., Kb=100, $k_{m,1}$=10, $k_{m,2}$=8, $k_{m,5}$=5). According to equations (25)-(26), the measurement results and the mutual correlation function with this reference vector are illustrated in FIGS. 12A and 12B, respectively. It is not difficult to notice that the mutual correlation function Rxy represents the disturbance character in sensors matrix k precisely.

Figure 13:
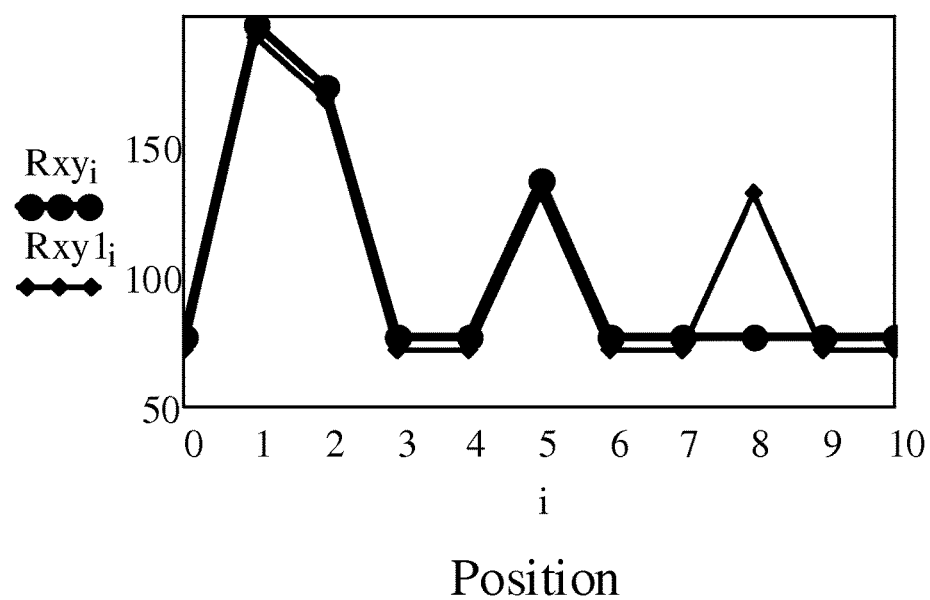
FIG. 13 illustrates an autocorrelation function according to another embodiment.

In one embodiment, there is a column m+1 in the sensors matrix. In this embodiment, the external disturbance influences both columns equally. This means that $k_{1m+1,1}$=10, $k_{m+1,2}$=8, $k_{m+1,5}$=5. But in column m+1, there is excitation $k_{m+1,8}$=5 which does not influence column m (e.g., Rxy= [77,197,173,77,77,137,77,77,77,77,77] and Rxy1=[72,192, 168,72,72,132,72,72,132,72,72]). As illustrated in the calculation results shown in FIG. 13, appearance of additional disturbance in column m+1 has lowered the general level of auto correlation function Rxy1. This event has distorted the ratio between the correlation peaks in the positions where they were equal in both columns.

Issuing from the properties of Barker codes auto correlation function, these distortions can be easily removed. To realize this it is enough to subtract the minimal value from the obtained values in each column as it follows:

$$ik[s,m] = Rxy[s,m] - \min\{Rxy[:,m]\} \quad (32)$$

In this case, the following is obtained:

$$Ik[:,m] = Rxy - 77 = [0,120,96,0,0,60,0,0,0,0,0];$$

$$Ik[:,m+1] = Rxy1 - 72 = [0,120,96,0,0,60,0,0,60,0,0];$$

$$\text{for } k[:,m] = [0,10,8,0,0,5,0,0,0,0,0];$$

$$k[:,m+1] = [0,10,8,0,0,5,0,0,5,0,0].$$

This means that a non-distorted image of disturbance in the sensors matrix has been obtained.

In other embodiments, complementary sequences can be used. A peculiarity of complementary sequences is the fact that their auto correlation functions sum gives the Kronecker delta-function as follows:

$$Raa(i)+Rbb(i)=2\cdot n\cdot\delta(i), \forall i \in 0 \ldots n-1. \quad (33)$$

So, complementary sequences correspond to hypothesis (19).

If Faref and Fbref are regarded as complementary, then created from them circulant excitation matrixes Fa and Fb will also be complementary. The sensors matrix excitation can be conducted as [Fa Fb] or {Fa Fb}; where [ . . . ] denotes concatenation and { . . . }—interleaving of sequences. As a result of such excitation the matrixes of results $[Na_{ADC}\ Nb_{ADC}]$ or $\{Na_{ADC}\ Nb_{ADC}\}$ are obtained. Gain values are calculated according to (33) as follows:

$$Kx[s, m] = \frac{1}{2\cdot n} \cdot \sum_{i=0}^{n-1} (Na_{ADC}[i, m] \cdot Faref[i-s] + Nb_{ADC}[i, m] \cdot Fbref[i-s]). \quad (34)$$

Applying complementary sequences requires doubling the number of scanning phases in the sensors matrix scanning cycle and correspondingly doubling the number of the result calculation operations. This means that if the scanning period remains constant, one scanning session period is to be halved, as compared to the scanning session period if one excitation matrix is used.

Apart from this, the number of calibration additive efficiencies will be halved as the components sum in complementary sequences is different. Since while using complementary sequences the calculation result is defined as a sum of two scanning sessions, the properties of noises reduction will not worsen. The main advantage of applying complementary sequences is a possibility of creating sequences with zero values of the auto correlation function beyond the correlation peak of the sidelobes.

Table 1-4 includes a comparison of the different scanning techniques.

TABLE 1-4

| Parameter | Traditional scan | Multiphase scan | | |
|---|---|---|---|---|
| | | Complete task solving | Correlation Methods | |
| | | | Barker codes | Complementary sequences |
| Matrix size (Col* Row) | M*N | M*N | M*N | M*N |
| Scanning cycle time | T | T | T | ≈T |
| SNR | A | $<A\sqrt{N}$ | $A\sqrt{N}$ | $A\sqrt{N}$ |
| Additional calculation (Number/Type) | none | M*N²/ MAC | ≈M*N² + 2* M*N/ ±according to (32) | 2*M*N²/ ±according to (34) |
| Receiver input current variation for the different scanning stages | Small | Small with circular matrix | Small | Large |
| value of TX current load | I | N*I | N*I | N*I |

The table indicates that 7 and 11 element length Barker codes may be more convenient for sensor matrices with the same number of TX electrode lines, while the complementary sequences may be more convenient for sensor matrices with even number of TX electrode lines.

It should be noted that the embodiments described above use an in-phase and opposite phase signal. The in-phase and opposite phases may be used when using inverters or complementary output stages to generate these signals. Also, the in-phase and opposite phase signals may be used for simplifying the measurement by the ADC as +1 or −1 data signs. However, in other embodiments, different arbitrary phase signals may be used. For example, an in-phase signal and one or more out-of-phase signals may be used.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

We claim:

1. A method of detecting objects proximate to a touch panel having a plurality of TX electrodes and a plurality of RX electrodes, comprising:
receiving two distinct drive signals;
for each of a plurality of scanning stages:
selecting a TX pattern for a first scanning stage of the plurality of scanning stages;
selecting a respective one of the two distinct drive signals to drive each of the plurality of TX electrodes substantially simultaneously according to a respective TX pattern, wherein the respective TX pattern for each scanning stage, after the first scanning stage, is generated by a cyclic rotation of the TX pattern for the first scanning stage, and each pair of the plurality of TX electrodes has at least one stage in which the selected drive signals are distinct from each other; and
receiving sense signals from the plurality of RX electrodes, wherein each of the plurality of sense signals represents capacitance of a respective intersection of a respective TX electrode and a respective RX electrode; and
correlating the received sense signals for the plurality of scanning stages with the received drive signals to detect an object proximate to the touch panel.

2. The method of claim 1, wherein the two distinct drive signals include a carrier signal and a second signal created by inverting the carrier signal.

3. The method of claim 2, wherein the two distinct drive signals include a signal representing a grounded state.

4. The method of claim 1, wherein the two distinct drive signals include a carrier signal and a second signal that is phase shifted from the carrier signal.

5. The method of claim 1, wherein the two distinct drive signals include a first drive signal and a second drive signal that has a different amplitude or frequency from the first drive signal.

6. The method of claim 1, wherein the TX pattern for the second scanning stage is specified as the cyclic rotation of the TX pattern for the first scanning stage.

7. The method of claim 1, wherein the two distinct drive signals include a first drive signal and a second drive signal, and one or more of the TX patterns specifies an alternating sequence of the first and second drive signals for the TX electrodes.

8. A touch sensing apparatus, comprising:
a touch sensing surface having a plurality of TX electrodes and a plurality of RX electrodes; and
capacitance sensing circuitry configured for:
receiving two distinct drive signals;
for each of a plurality of scanning stages:
selecting a TX pattern for a first scanning stage of the plurality of scanning stages;
selecting a respective one of the two distinct drive signals to drive each of the plurality of TX electrodes substantially simultaneously according to a respective TX pattern, wherein the respective TX pattern for each scanning stage, after the first scanning stage, is generated by a cyclic rotation of the TX pattern for the first scanning stage, and each pair of the plurality of TX electrodes has at least one stage in which the selected drive signals are distinct from each other; and
receiving sense signals from the plurality of RX electrodes, wherein each of the plurality of sense signals represents capacitance of a respective intersection of a respective TX electrode and a respective RX electrode; and
correlating the received sense signals for the plurality of scanning stages with the received drive signals to detect an object proximate to the touch panel.

9. The touch sensing apparatus of claim 8, wherein the two distinct drive signals include a carrier signal and a second signal created by inverting the carrier signal.

10. The touch sensing apparatus of claim 9, wherein the two distinct drive signals include a signal representing a grounded state.

11. The touch sensing apparatus of claim 8, wherein the two distinct drive signals include a carrier signal and a second signal that is phase shifted from the carrier signal.

12. The touch sensing apparatus of claim 8, wherein the two distinct drive signals include a first drive signal and a second drive signal that has a different amplitude or frequency from the first drive signal.

13. The touch sensing apparatus of claim 8, wherein the TX pattern for the second scanning stage is specified as the cyclic rotation of the TX pattern for the first scanning stage.

14. The touch sensing apparatus of claim 8, wherein the two distinct drive signals include a first drive signal and a second drive signal, and one or more of the TX patterns specifies an alternating sequence of the first and second drive signals for the TX electrodes.

15. A host device, comprising:
a display;
a capacitance sensing array having a plurality of TX electrodes and a plurality of RX electrodes; and
a touchscreen controller coupled to the capacitance sensing array, wherein the touch screen controller is configured for:
receiving two distinct drive signals;
for each of a plurality of scanning stages:
selecting a TX pattern for a first scanning stage of the plurality of scanning stages;
selecting a respective one of the two distinct drive signals to drive each of the plurality of TX electrodes substantially simultaneously according to a respective TX pattern, wherein the respective TX pattern for each scanning stage, after the first scanning stage, is generated by a cyclic rotation of the TX pattern for the first scanning stage, and each pair of the plurality of TX electrodes has at least one stage in which the selected drive signals are distinct from each other; and
receiving sense signals from the plurality of RX electrodes, wherein each of the plurality of sense signals represents capacitance of a respective intersection of a respective TX electrode and a respective RX electrode; and
correlating the received sense signals for the plurality of scanning stages with the received drive signals to detect an object proximate to the touch panel.

16. The host device of claim 15, wherein the two distinct drive signals include a carrier signal and a second signal created by inverting the carrier signal.

17. The host device of claim 16, wherein the two distinct drive signals include a signal representing a grounded state.

18. The host device of claim 15, wherein the two distinct drive signals includes a carrier signal and a second signal that is phase shifted from the carrier signal.

19. The host device of claim 15, wherein the two distinct drive signals include a first drive signal and a second drive signal that has a different amplitude or frequency from the first drive signal.

20. The method of claim 1, wherein the touch panel is electrically coupled to a sequence generation circuitry including a shift register, the method further comprising:

for each of the plurality of scanning stages, generating by the sequence generation circuitry an output word having a plurality of binary bits, wherein each binary bit corresponds to a distinct TX electrode of the plurality of TX electrodes and each binary bit is configured to select the respective one of the two distinct drive signals to drive the distinct TX electrode.

* * * * *

UNITED STATES PATENT AND TRADEMARK OFFICE
CERTIFICATE OF CORRECTION

PATENT NO. : 10,216,314 B2
APPLICATION NO. : 15/065820
DATED : February 26, 2019
INVENTOR(S) : Kremin et al.

It is certified that error appears in the above-identified patent and that said Letters Patent is hereby corrected as shown below:

In the Claims

Claim 1, Column 25, Line 18, please delete "receiving sense" and insert --receiving a plurality of sense--;

Claim 8, Column 25, Line 64, please delete "receiving sense" and insert --receiving a plurality of sense--;

Claim 15, Column 26, Line 48, please delete "receiving sense" and insert --receiving a plurality of sense--;

Claim 18, Column 26, Line 62, please delete "signals includes a" and insert --signals include a--.

Signed and Sealed this
Fourteenth Day of May, 2019

Andrei Iancu
*Director of the United States Patent and Trademark Office*